(12) United States Patent
Shah et al.

(10) Patent No.: US 7,853,957 B2
(45) Date of Patent: Dec. 14, 2010

(54) DOORBELL MECHANISM USING PROTECTION DOMAINS

(75) Inventors: Hemal V. Shah, Austin, TX (US); Gary Y. Tsao, Austin, TX (US); Arturo L. Arizpe, Wimberley, TX (US); Ali S. Oztaskin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1427 days.

(21) Appl. No.: 11/106,824

(22) Filed: Apr. 15, 2005

(65) Prior Publication Data

US 2006/0235999 A1 Oct. 19, 2006

(51) Int. Cl.
*G06F 9/44* (2006.01)

(52) U.S. Cl. .................. 719/318; 711/147; 711/163

(58) Field of Classification Search ........................ None
See application file for complete search history.

(56) References Cited

U.S. PATENT DOCUMENTS

| | | | |
|---|---|---|---|
| 4,903,234 A | 2/1990 | Sakuraba et al. |
| 5,214,759 A | 5/1993 | Yamaoka et al. |
| 5,263,142 A | 11/1993 | Watkins et al. |
| 5,471,618 A | 11/1995 | Isfeld |
| 5,479,627 A | 12/1995 | Khalidi et al. |
| 5,557,744 A | 9/1996 | Kobayakawa et al. |
| 5,564,005 A | 10/1996 | Weber et al. |
| 5,566,337 A | 10/1996 | Szymanski et al. |
| 5,784,707 A | 7/1998 | Khalidi et al. |
| 6,021,482 A | 2/2000 | Wu et al. |
| 6,081,848 A | 6/2000 | Grun et al. |
| 6,243,778 B1 | 6/2001 | Fung et al. |
| 6,321,276 B1 | 11/2001 | Forin |
| 6,370,356 B2 | 4/2002 | Duplessis et al. |
| 6,549,997 B2 | 4/2003 | Kalyanasundharam |
| 6,625,715 B1 | 9/2003 | Mathews |
| 6,671,791 B1 | 12/2003 | McGrath |
| 6,721,806 B2 | 4/2004 | Boyd et al. |
| 6,750,870 B2 | 6/2004 | Olarig |
| 6,760,783 B1 | 7/2004 | Berry |
| 6,792,483 B2 | 9/2004 | Schmidt |
| 6,795,442 B1 | 9/2004 | Clayton et al. |
| 6,804,631 B2 | 10/2004 | Kelley et al. |

(Continued)

OTHER PUBLICATIONS

Culley, P., U. Elzur, R. Recio, & S. Bailer, "Marker PDU Aligned Framing for TCP Specification (Version 1.0)," Release Specification of the RDMA Consortium, Oct. 25, 2002, 32 pp.

(Continued)

*Primary Examiner*—Hyung S Sough
*Assistant Examiner*—Kimberly Jordan
(74) *Attorney, Agent, or Firm*—Konrad Raynes & Victor LLP; Janaki K. Davda

(57) ABSTRACT

In accordance with certain other techniques, doorbell information is received. A doorbell structure address is decoded from the doorbell information. A first protection domain identifier is determined from the doorbell structure address. A resource context of a data structure is determined from the doorbell information. The resource context at the doorbell address is read to determine a second protection domain identifier. The first protection domain identifier and the second protection domain identifier are compared to determine whether to update the resource context of the doorbell structure.

18 Claims, 17 Drawing Sheets

U.S. PATENT DOCUMENTS

| | | | |
|---|---|---|---|
| 6,810,442 | B1 | 10/2004 | Lin et al. |
| 7,010,633 | B2 | 3/2006 | Arndt et al. |
| 7,076,569 | B1 | 7/2006 | Bailey et al. |
| 7,089,326 | B2 | 8/2006 | Boucher et al. |
| 7,117,339 | B2 | 10/2006 | Gurumoorthy et al. |
| 7,142,539 | B2 | 11/2006 | Grinfeld |
| 7,149,227 | B2 | 12/2006 | Stoler et al. |
| 7,149,817 | B2 | 12/2006 | Pettey |
| 7,149,819 | B2 | 12/2006 | Pettey |
| 7,164,689 | B2 | 1/2007 | Ito et al. |
| 7,167,926 | B1 | 1/2007 | Boucher et al. |
| 7,167,927 | B2 | 1/2007 | Philbrick et al. |
| 7,181,541 | B1 | 2/2007 | Burton et al. |
| 7,197,588 | B2 | 3/2007 | Tsao et al. |
| 7,263,568 | B2 | 8/2007 | Shah et al. |
| 7,305,493 | B2 | 12/2007 | McAlpine et al. |
| 2001/0037397 | A1 | 11/2001 | Boucher et al. |
| 2002/0066033 | A1 | 5/2002 | Dobbins et al. |
| 2002/0152327 | A1 | 10/2002 | Kagan et al. |
| 2002/0165899 | A1 | 11/2002 | Kagan et al. |
| 2003/0002508 | A1 | 1/2003 | Dierks, Jr. et al. |
| 2003/0065856 | A1 | 4/2003 | Kagan et al. |
| 2004/0003126 | A1 | 1/2004 | Boucher et al. |
| 2004/0017819 | A1 | 1/2004 | Kagan et al. |
| 2004/0027374 | A1 | 2/2004 | Cirne et al. |
| 2004/0049580 | A1* | 3/2004 | Boyd et al. ............... 709/226 |
| 2004/0237093 | A1 | 11/2004 | Sluiman et al. |
| 2005/0080928 | A1 | 4/2005 | Beverly et al. |
| 2005/0144402 | A1 | 6/2005 | Beverly |
| 2005/0216597 | A1 | 9/2005 | Shah et al. |
| 2005/0228922 | A1 | 10/2005 | Tsao et al. |
| 2005/0228936 | A1 | 10/2005 | Kuo et al. |
| 2006/0004795 | A1 | 1/2006 | Shah et al. |
| 2006/0004941 | A1 | 1/2006 | Shah et al. |
| 2006/0004983 | A1 | 1/2006 | Tsao et al. |
| 2006/0072564 | A1 | 4/2006 | Cornett et al. |
| 2006/0136697 | A1 | 6/2006 | Tsao et al. |
| 2008/0148008 | A1 | 6/2008 | Arndt et al. |

OTHER PUBLICATIONS

EP Office Action, Feb. 9, 2006, for International Application No. 03 812 441.8-22111.
Hilland, J., P. Culley, J. Pinkerton, & R. Recio, "RDMA Protocol Verbs Specification (Version 1.0)," Release Specification of the RDMA Consortium, Apr. 2003, 243 pp.
Microsoft Corporation, "Interrupt Architecture Enhancements in Microsoft Windows, Codenamed "Longhorn"", Windows Platform Design Notes, © 2003 Microsoft Corporation, 42 pp.
PCI Special Interest Group, PCI Local Bus Specification Rev. 2.3: PCI Engineering Change Notice—MSI-X, Jun. 10, 2003, 23 pp.
PCI Special Interest Group, PCI-SIG 2004; web pages including Mar. 20, 2002 news release "PCI-SIG Releases New PCI Version 2.3 Local Bus Specification for Migration to Low-Voltage Designs," 18 pp. Available from the Internet at <URL: http://www.pcisig.com>.
PCT International Search Report, Aug. 9, 2004, for International Application No. PCT/US03/37254.
Salzmann, T., and M. Peppel, "GTO Driving Protection Technique with Status Monitoring", IEEE Transactions on Industry Applications, vol. 24, Issue 1, Part 1, 1998, pp. 115-120. [Abstract].
US Final Office Action, May 24, 2006, for U.S. Appl. No. 10/815,902.
US First Office Action, Dec. 13, 2005, for U.S. Appl. No. 10/815,902.
US First Office Action, Mar. 10, 2006, for U.S. Appl. No. 10/816,435.
Wangdee, W. and R. Billinton, "Utilization of Time Varying Event-based Customer Interruption Cost Load Shedding Schemes", 2004 International Conference on Probabilistic Methods Applied to Power Systems, Sep. 2004, pp. 769-775. [Abstract].
Shanley, T. and D. Anderson, (Eds.), "PCI System Architecture," 4th ed.; TOC pp. v-xlii; Intro. pp. 1-6; Chapter 1 pp. 7-13; Chapter 2 pp. 15-21; 1999.
U.S. Appl. No. 11/018,009, filed Dec. 20, 2004.
U.S. Appl. No. 11/029,917, filed Jan. 5, 2005.
IEEE Standard for Information Technology 802.3, Part 3: Carrier Sense Multiple Access with Collision Detection (CSMA/CD) Access Method and Physical Layer Specifications; Institute of Electrical and Electronics Engineers, Inc., Mar. 8, 2002; 33 pp.
IEEE Std. 802.11b-1999, "Wireless LAN Medium Access Control (MAC) and Physical Layer (PHY) Specifications . . . ," Institute of Electrical and Electronics Engineers, Inc., Sep. 16, 1999; 17 pp.
Weber, et al., "Fibre Channel (FC) Frame Encapsulation," Network Working Group, RFC 3643, Dec. 2003; 17 pp.
Anderson, Don, et al., eds. "PCI System Architecture," $4^{th}$ ed.; TOC pp. v-xlii; Intro. pp. 1-6; Chapter 1 pp. 7-13; Chapter 2 pp. 15-21; 1999.
Serial ATA: High Speed Serialized AT Attachment, Rev. 1.0; Serial ATA Workgroup, Aug. 29, 2001; 36 pp.
Information Technology—SCSI Controller Commands—2 (SCC-2), dpANS T10 Project 1225-D, Rev. 4, Sep. 12, 1997; 24 pp.
RDMA Consortium, "Architectural Specifications for RDMA over TCP/IP," web page printed Dec. 22, 2005; http://www.rdmaconsortium.org/home; 1 p.
Virtual Interface Architecture Specification, Draft Rev. 1.0, Dec. 4, 1997; Compaq Computer Corp., Intel Corporation, Microsoft Corporation; 83 pp.
InfiniBand™ Architecture Specification vol. 1 Release 1.0, Oct. 24, 2000; Copyright 1999 by InfiniBand Trade Association; 880 pp.
InfiniBand™ Architecture Specification vol. 2 Release 1.0, Oct. 24, 2000; Copyright 1999 by InfiniBand Trade Association; 623 pp.
Correia, P., "Developing a Third Generation I/O Specification", Intel Developer Update Magazine, Mar. 2002, pp. 1-4.
Banikazemi, M., J. Liu, S. Kutlug, A. Ramakrishnan, P. Sadayappan, H. Shah, and D.K. Panda, "VIBe: A Micro-Benchmark Suite for Evaluating Virtual Interfacearchitecture (VIA Implementations)", Proceedings of the 15th International Parallel and Distributed Processing Symposium, Apr. 2001, 10 pp.
Buonadonna, P., and D. Culler, "Queue Pair IP: A Hybrid Architecture for System Area Networks", Proceedings of the 29th Annual International Symposium on Computer Architecture, 2002, pp. 247-256.
Rangarajan, M., A. Bohra, K. Banerjee, E.V. Carrera, and R. Bianchini, "TCP Servers: Offloading TCP Processing in Internet Servers. Design, Implementation, and Performance", Technical Report, Rutgers University, 2002, pp. 1-14.
Recio, R., P. Culley, D. Garcia, & J. Hilland, "An RDMA Protocol Specification (Version 1.0)," Release Specification of the RDMA Consortium, Oct. 2002, 60 pp.
Regnier, G., S. Makineni, R. Illikkal, R. Iyer, D. Minturn, R. Huggahalli, D. Newell, L. Cline, and A. Foong, "TCP Onloading for Data Center Servers", Computer, 2004, pp. 48-58.
Shah, H., J. Pinkerton, R. Recio, & P. Culley, "Direct Data Placement over Reliable Transports (Version 1.0)," Release Specification of the RDMA Consortium, Oct. 2002, 35 pp.
Stevens, R.W., "UNIX Network Programming", 1990, pp. 209-210.
Turner, Y., T. Brecht, G. Regnier, V. Saletore, G. Janakiraman, and B. Lynn, "Scalable Networking for Next-Generation Computing Platforms", Proceedings of the Third Annual Workshop on System Area Networks, Feb. 14, 2004, 11 pp.
Webopedia, "Computer System", [online], Oct. 31, 2001, [Retrieved on Mar. 27, 2007], retrieved from the Internet at <URL: http://web.archive.org/web/20021031123016/http://webopedia.com/term/c/computer_system.html>, 2 pp.

* cited by examiner

Send Structure Work Request Doorbell Structure

Shared Receive Structure Work Request Doorbell Structure

Event Structure Update Doorbell Structure

Completion Structure CNR Acknowledge Doorbell Structure

Completion Structure Read Index Update Doorbell Structure

Completion Structure Notify Index Update Doorbell Structure

US 7,853,957 B2

DOORBELL MECHANISM USING PROTECTION DOMAINS

BACKGROUND

A Network Interface Card (NIC) may be described as an expansion board that may be inserted into a computer so the computer can be connected to a network. Some NICs are designed for a particular type of network, protocol, and media.

Remote Direct Memory Access (RDMA) may be described as a communications technique that allows data to be transmitted directly from the memory of a first computer to the memory of a second computer without use of either computers' operating system, central processing unit, and buffers. RDMA is being designed by an RDMA Consortium.

An RDMA enabled Network Interface Card (RNIC) may be described as a network interface card that enables data to be transmitted directly from the memory of a first computer to the memory of a second computer. Doorbell registers may be described as registers that are used by programs at a computer to communicate with the RNIC. However, it is possible for a second program to overwrite data in a doorbell register that was originally written by a first program.

Thus, notwithstanding available techniques for transferring data between computers, there is a need in the art for improved transfer of data between computers that prevents one program from overwriting data of another program.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
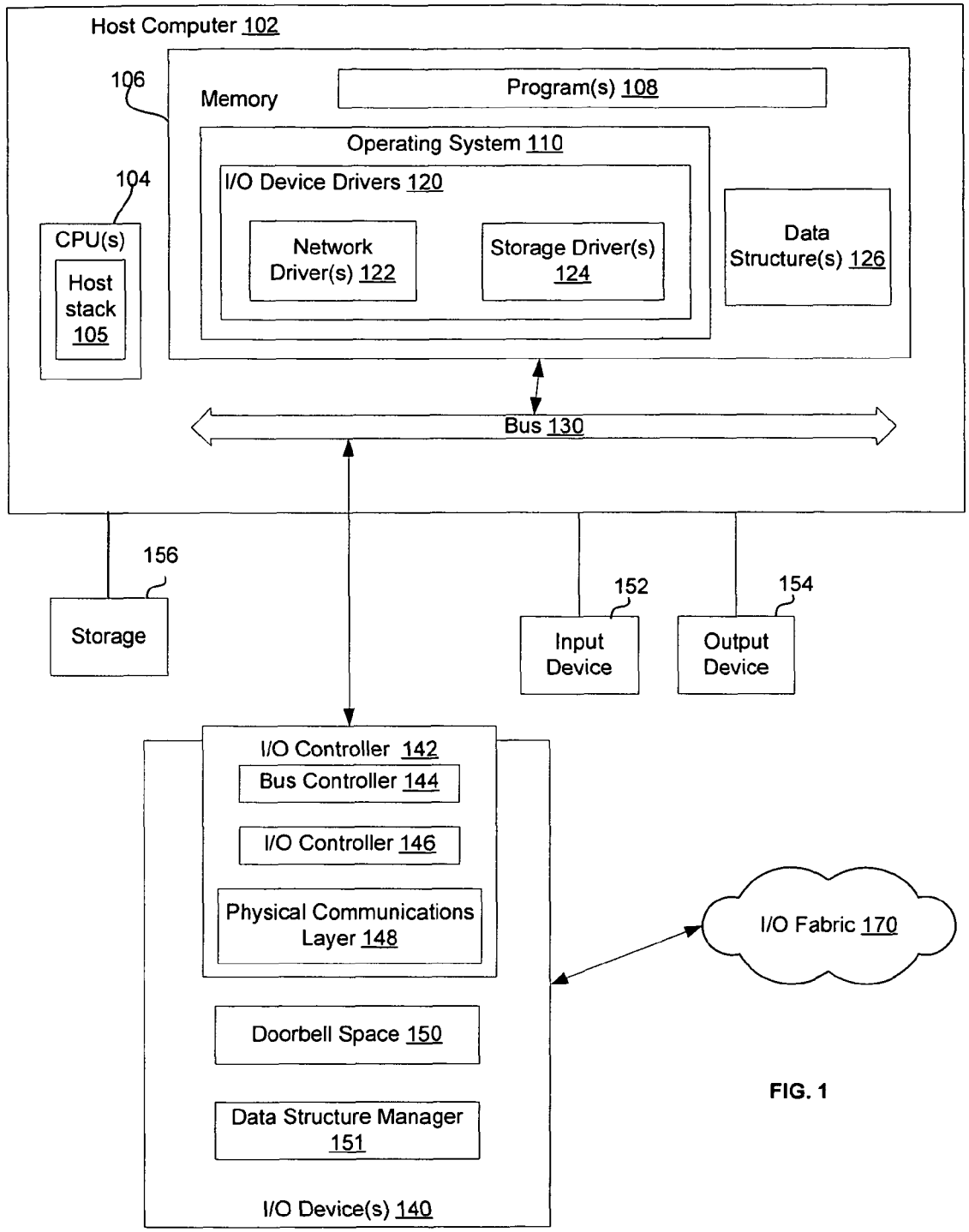
FIG. 1 illustrates a computing environment in accordance with certain embodiments.

FIG. 1 illustrates a computing environment in accordance with certain embodiments. A host computer 102 is connected to one or more Input/Output (I/O) devices 140 via a bus 130. In certain embodiments, the I/O devices 140 are RDMA enabled Network Interface Controllers (RNICs). Any number of I/O devices may be attached to host computer 102. An I/O device 140 may be described as a device that is part of a host system and that is attached to an I/O fabric 170. The host computer 102 uses I/O devices in performing I/O operations (e.g., network I/O operations, storage I/O operations, etc.).

Host computer 102 includes one or more central processing units (CPUs) 104, a volatile memory 106 and non-volatile storage 156 (e.g., magnetic disk drives, optical disk drives, a tape drive, etc.). A host stack 105 executes on at least one CPU 104. A host stack may be described as software that includes application programs, libraries, drivers, and an operating system that run on host processors (e.g., CPU 104) of a host computer 102.

One or more programs 108 (e.g., host software, application programs, and/or other programs) and an operating system 110 reside in memory 106 and execute on one or more CPUs 104. Operating system 110 includes I/O device drivers 120. The I/O device drivers 120 include one or more network drivers 122 and one or more storage drivers 124 that reside in memory 106 during execution. The network drivers 122 and storage drivers 124 may be described as types of I/O device drivers 120. Also, one or more data structures 126 are in memory 106.

Each I/O device driver 120 includes I/O device specific commands to communicate with each I/O device 140 and interfaces between the operating system 110 and each I/O device 140. The I/O devices 140 and I/O device drivers 120 implement logic to process I/O functions.

Each I/O device 140 includes various components implemented in the hardware of the I/O device 140. Each I/O device 140 is capable of transmitting and receiving packets of data over I/O fabric 170, which may comprise a Local Area Network (LAN), the Internet, a Wide Area Network (WAN), a Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Each I/O device 140 includes an I/O controller 142, a doorbell space 150, and a data structure manager 151. The I/O controller 142 may be a network I/O controller or a storage I/O controller. The I/O controller 142 is coupled to a bus connected to the host computer 102. In certain embodiments, an I/O controller 142 is a Host Bus Adapter (HBA). In certain embodiments, an I/O controller 142 includes bus controller 144, I/O controller 146, and physical communications layer 148. A bus controller 144 enables each I/O device 140 to communicate on a computer bus 130, which may comprise any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc. In alternative embodiments, the I/O controller 142 may be connected to the host computer 102 with an I/O fabric or other connection means.

The I/O controller 146 implements functions used to perform I/O functions. The physical communication layer 148 implements functionality to send and receive network packets to and from remote data storages over an I/O fabric 170. In certain embodiments, the I/O controller 142 may implement the Ethernet protocol (IEEE std. 802.3, published Mar. 8, 2002), Fibre Channel (IETF RFC 3643, published December 2003), or any other suitable networking and storage protocol.

The I/O device 140 also includes a doorbell space 150. Embodiments partition the doorbell space 140 into protection domains, with each protection domain including doorbell structures. In certain embodiments, the doorbell structures are doorbell registers. A protection domain may be described as a mechanism for tracking the association of data structures 126 and a portion of doorbell space 150. A protection domain may be set to provide protection of one process from accessing the memory of another process (e.g., through the use of an RNIC).

Each I/O device 140 includes a data structure manager 151 that is responsible for updating the appropriate data structure 126 and performing other tasks.

The host computer 102 may comprise any suitable computing device, such as a mainframe, server, personal computer, workstation, laptop, handheld computer, etc. Any CPU 104 and operating system 110 may be used. Programs and data in memory 106 may be swapped into and out of storage 156 as part of memory management operations. The storage 156 may comprise an internal storage device or an attached or network accessible storage. Programs in the storage 156 are loaded into the memory 106 and executed by the CPU 104. An input device 152 and an output device 154 are connected to the host computer 102. The input device 152 is used to provide user input to the CPU 104 and may be a keyboard, mouse, pen-stylus, microphone, touch sensitive display screen, or any other suitable activation or input mechanism. The output device 154 is capable of rendering information transferred from the CPU 104, or other component, at a display monitor, printer, storage or any other suitable output mechanism.

In certain embodiments, in addition to the I/O device drivers 120, the host computer 102 may include other drivers. The I/O devices 140 may include additional hardware logic to perform additional operations to process received packets from the host computer 102 or the I/O fabric 170. Further, the I/O devices 140 may implement a transport layer offload engine (TOE) to implement the transport protocol layer in the I/O device 140 as opposed to the I/O device drivers 120 to further reduce host computer 102 processing burdens. Alternatively, the transport layer may be implemented in the I/O device drivers 120 or other drivers (for example, provided by an operating system).

Various structures and/or buffers (not shown) may reside in memory 106 or may be located in a storage unit separate from the memory 106 in certain embodiments.

In alternative embodiments, the doorbell mechanism may be implemented in a motherboard, as part of an integrated device, or as part of a processor (e.g., CPU 104).

In certain embodiments, the I/O device drivers 120 and the I/O controller 142 may be implemented in integrated circuit components on a motherboard of a computer (e.g., host 102). Thus, an I/O device driver 120 and/or the I/O controller 142 may be coupled to a motherboard. In alternative embodiments, the I/O device drivers 120 and the I/O controller 142 may be implemented in integrated circuit components on an expansion card that may be inserted into an expansion card slot on a motherboard of a computer (e.g., host 102). Thus, an I/O device driver 120 and/or the I/O controller 142 may be coupled to an expansion card.

Figure 2:
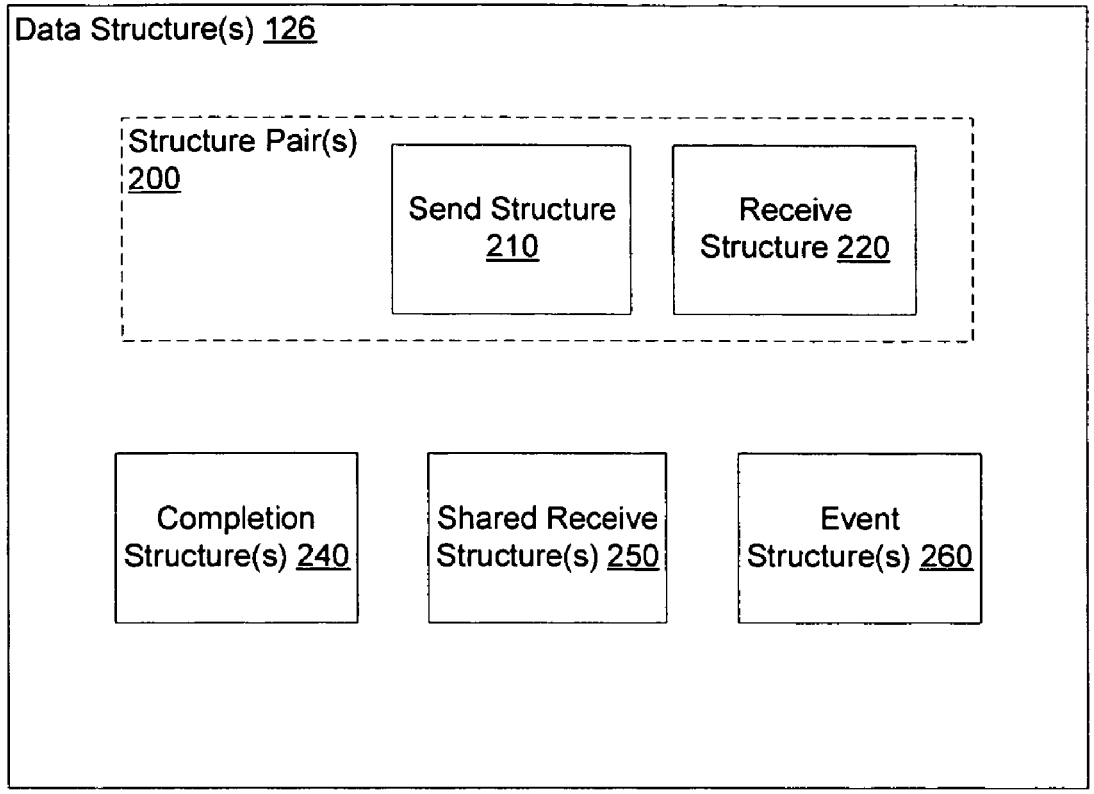
FIG. 2 illustrates a data structures at a host computer in accordance with certain embodiments.

FIG. 2 illustrates data structures 126 at a host computer 102 in accordance with certain embodiments. The data structures 126 include one or more structure pairs 200 each having a send structure 210 and a receive structure 220, completion structures 240, shared receive structures 250, and event structures 260. In certain embodiments, the data structures 126 are queues. In certain embodiments, one or more of the data structures 126 have structure identifiers (e.g., a structure pair 200 has a structure pair identifier). In certain embodiments, each data structure 126 has a read indicator (e.g., an index into an array or a pointer) indicating a location in the data structure 126 to be read and a write indicator (e.g., an index into an array or a pointer) indicating a location in the data structure 126 where data may be written.

Structure pairs 200 are I/O device 140 resources that are used by programs 108 to submit work requests to the I/O device 140. In certain embodiments, each structure pair 200 is associated with a TCP connection. Each structure pair 200 consists of two work structures: a send structure 210 and a receive structure 220. Work requests provide the mechanism for programs 108 to store work structure elements onto the send and receive structures 210, 220 of a structure pair 200. In certain embodiments, a program 108 issues a work request, and an I/O device driver 120 converts the work request into a work structure element that is hardware specific. In a send structure 210, examples of work structure elements include send requests to send data from one program to another program, RDMA read requests to read data from another program, and RDMA write requests to write data into the memory of another program. The programs may reside on the same computer or on different computers. In a receive structure 220, examples of work structure elements include a program 108 posting locations of buffers to receive an incoming Send Type message.

Completion structures 240 provide a mechanism for a program 108 to retrieve work request status. For example, a program 108 stores a work request in a send structure 210 or receive structure 220. The I/O device 140 processes the work request and stores a status in a completion structure 240. In addition, there are notification mechanisms (e.g., interrupts) that help a program 108 to notice when work requests have completed processing in the I/O device 140. In various embodiments, a completion structure 240 may be associated with one send structure 210, one receive structure 220, a structure pair 200, or any combination of these. For example, for four TCP connections, there may be four send structures 210 and four receive structures 220, along with eight completion structures 240 (one for each send, request structure 210, 220) or two completion structures 240 (one shared by the send structures 210 and one shared by the receive structures 220) or one completion structure 240 (shared by the four send and four receive structures 210, 220). The I/O device 140 is aware of which completion structure 240 is to be used to store status information for a particular work request. In certain embodiments, the status information is converted by the I/O device driver 120 into a format understood by the program 108 that issued the work request.

A shared receive structure 250 is an I/O device resource 140 that allows multiple receive structures to retrieve work structure elements from the same shared structure on an as needed basis. For example, a shared receive structure 250 may be associated with a specific receive structure 220, and the shared receive structure 250 may be used in addition to or instead of the receive structure 220.

The I/O device 140 notifies the I/O device driver 120 about the occurrence of any event by using an interrupt mechanism. An interrupt may be described as a signal from a device attached to a computer or from a program executing on the computer that causes the operating system of the computer to stop current processing and handle the interrupt. An event structure 260 is used for communicating the event information to the I/O device driver 120. In particular, event structures 260 are used by the I/O device 140 to communicate various events to the I/O device driver 120. Each element of the event structure 260 is referred to as event entry (EE). Each event entry has an event code field and event specific parameters. The event code identifies the interrupt source or function (e.g., a global event or a channel event). Also, the event entry may include additional information, such as read and/or write indicator values, connection context identifier, work or completion data structure identifier, etc. The event structure 260 may have variable event entries.

The I/O device 140 may write entries into the event structure 260 for various reasons, such as errors, channel events, global events, manageability events, etc. The I/O device 140 generates an interrupt depending upon the state of the event structure 260. Initially, both the I/O device 140 and the I/O device driver 120 point to the first event entry in the event structure 260. The I/O device 140 writes event specific information in the event entry indicated by the write indicator (e.g., a pointer) and advances the write indicator after writing an event entry to the event structure 260. Similarly, when the I/O device driver 120 retrieves an event entry, the I/O device driver 120 advances the read indicator. Thus, when an I/O device 140 wishes to signal an interrupt, the I/O device 140 first places an event entry into an event structure 260. The I/O device 140 also updates the write indicator, and, in some cases, sends an interrupt message.

For each of the data structures 126, programs 108 and/or device drivers 120 at the host computer 102 and the I/O device 140 maintain read and write indicators (e.g., pointers) to the data structures 126. In certain embodiments, the data structures 126 may be organized as circular buffers. For the send structures 210, the receive structures 220, and the shared receive structures 250, a program 108 may be described as a producer and the I/O device 140 may be described as a consumer. While for the completion structures 240 and the event structures 260, the I/O device 140 may be described as a producer and the program 108 may be described as a consumer.

A program 108 uses the doorbell mechanism provided by embodiments to notify the I/O device 140 of posted work requests to a receive structure 220, to notify the I/O device 140 of posted work requests to a send structure 210, to notify the I/O device 140 of posted work requests to a shared receive structure 250, to control completion notification events for a completion structure 240, and to control an event structure 260.

In certain embodiments, each I/O device 140 includes an event data structure manager 151 that is responsible for updating the appropriate data structure 126, updating the write indicator, and sending an interrupt.

Figure 3:
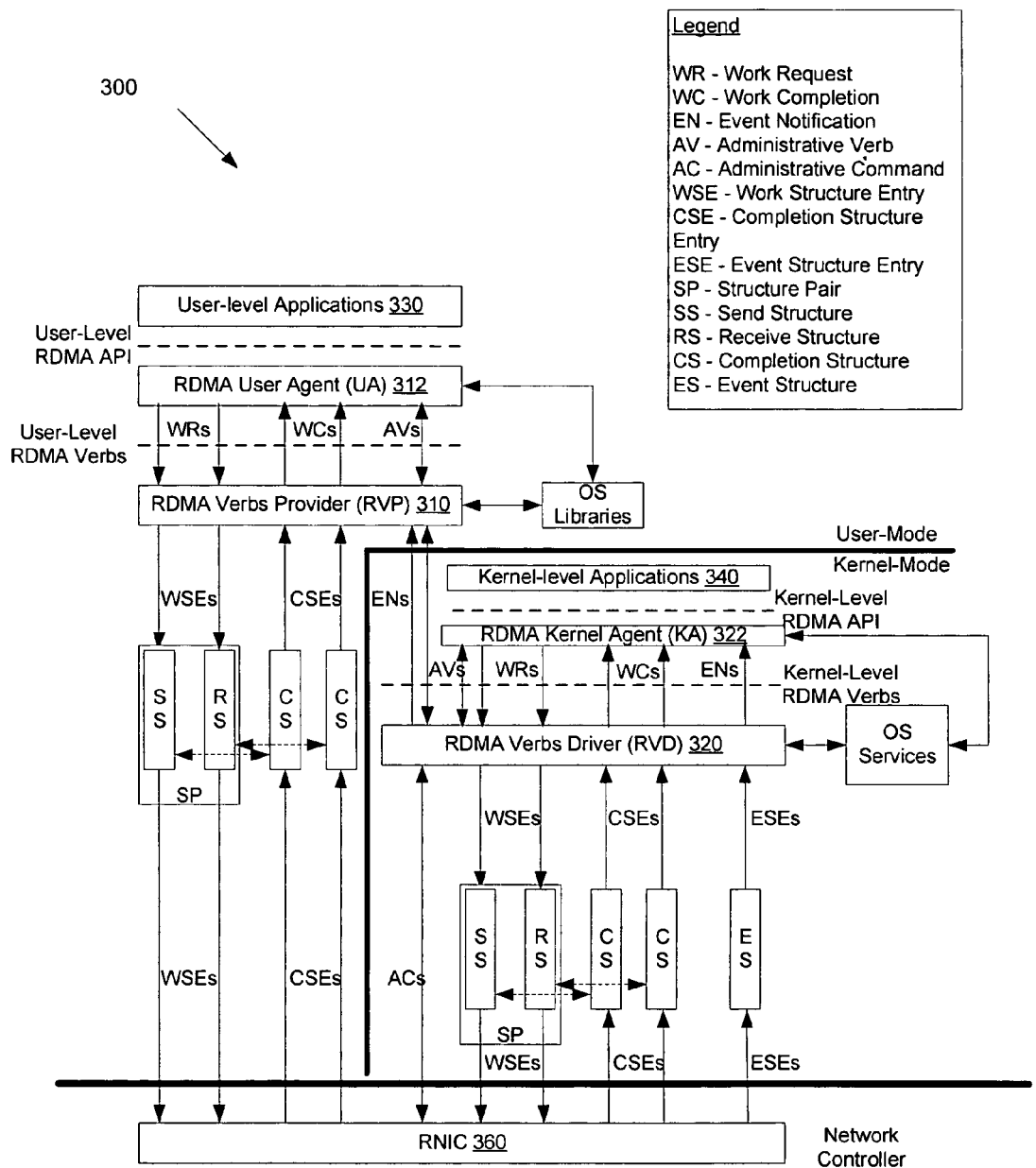
FIG. 3 illustrates RDMA Network Interface Controller (RNIC) software components that support RDMA Verbs functionality in accordance with certain embodiments.

FIG. 3 illustrates RDMA Network Interface Controller (RNIC) software components 300 that support RDMA verbs functionality in accordance with certain embodiments.

In certain embodiments, the I/O devices 140 are RDMA enabled Network Interface Controllers (RNICs). Examples herein may refer to RNICs merely to provide illustrations of embodiments and are not intended to limit the embodiments to RNICs. An RNIC may be used for low overhead communication over low latency, high bandwidth networks. RDMA Verbs may be described as an interface that provides a program 108 or other "Verbs consumer" (i.e., user-level applications or kernel-level applications) with a semantic definition of the RNIC interface. RDMA provides RDMA Verbs consumers the capability to control data placement, eliminate data copy operations, and reduce communications overhead and latencies by allowing one verbs consumer to directly place information in the memory of another verbs consumer, while preserving operating system and memory protection semantics.

An RNIC interface may be described as a locus of interaction between the consumer of RNIC services and the RNIC. Semantic behavior of the RNIC is specified via Verbs, which enable creation and management of structure pairs 200, management of the RNIC, management of work requests, and transfer of error indications from the RNIC interface that may be surfaced via the Verbs. Another function of the RNIC interface is the management of RNIC resources. In particular, direct, protected access to consumer memory is provided.

In FIG. 3, the RDMA Verbs Provider (RVP) 310 and the RDMA Verbs Driver (RVD) 320 access the RDMA hardware (i.e., RNIC 360). An operating system-specific RDMA stack builds on top of the RDMA Verbs Provider 310 and the RDMA Verbs Driver 320. Typically, RDMA Application Program Interfaces (APIs) are exposed by the Operating System Vendors (OSVs), and the RDMA user agent 312 and the RDMA kernel agent 322 are the modules provided by the OSV to hide the RDMA verbs functionality.

The doorbell space 150 may be written by the RDMA Verbs Provider 310 or the RDMA Verbs Driver 320. The RDMA Verbs Provider 310 and RDMA Verbs Driver 320 may also perform protection checks for the doorbell structures. The protection checks may include, for example, determining whether a program is allowed to write to a particular doorbell space.

The RDMA Verbs Provider 310 supports RDMA Verbs, such as API at the user-level. User-level applications 330 may directly use this API or may indirectly use this API by going through an operating system adaptation layer that sits above the RDMA Verbs Provider 310. The RDMA Verbs Provider 310 is responsible for converting work requests into work structure elements and completion structure elements into work completions. The RDMA Verbs Provider 310 directly accesses the RNIC through the doorbell structures for submitting work structure elements. The RDMA Verbs Provider 310 is responsible for converting work requests into work structure elements and completion structure elements into work completions. The RDMA Verbs Provider 310 performs resource management and administrative verbs functionality through the RDMA Verbs Driver 320.

The RDMA Verbs Driver 320 supports RDMA Verbs, such as API at the kernel-level. The kernel-level applications 340 may directly use this API or may indirectly use this API by going through an operating system adaptation layer that sits above the verbs driver 320. The RDMA Verbs Driver 320 is responsible for converting work requests into work structure elements and completion structure elements into work completions for the kernel-level applications. The RDMA Verbs Driver 320 directly accesses the RNIC using the doorbell structures. The administrative verbs related tasks are split between both the RDMA Verbs Driver 320 and the RNIC 360. The RDMA Verbs Driver 320 instructs RNIC to perform administrative verbs related tasks by using administrative commands.

The RDMA Verbs Driver 320 also performs the management of the RNIC resources. This includes the allocation and de-allocation of the resources. Some other management tasks performed by the RDMA Verbs Driver 320 include Translation and Protection Table (TPT) management (with the TPT being used to access protection information), RNIC device management, and administrative commands structure (e.g., queue) management. The RDMA Verbs Driver 320 is also responsible for interrupt processing, event notifications, and event structure management.

Figure 4:
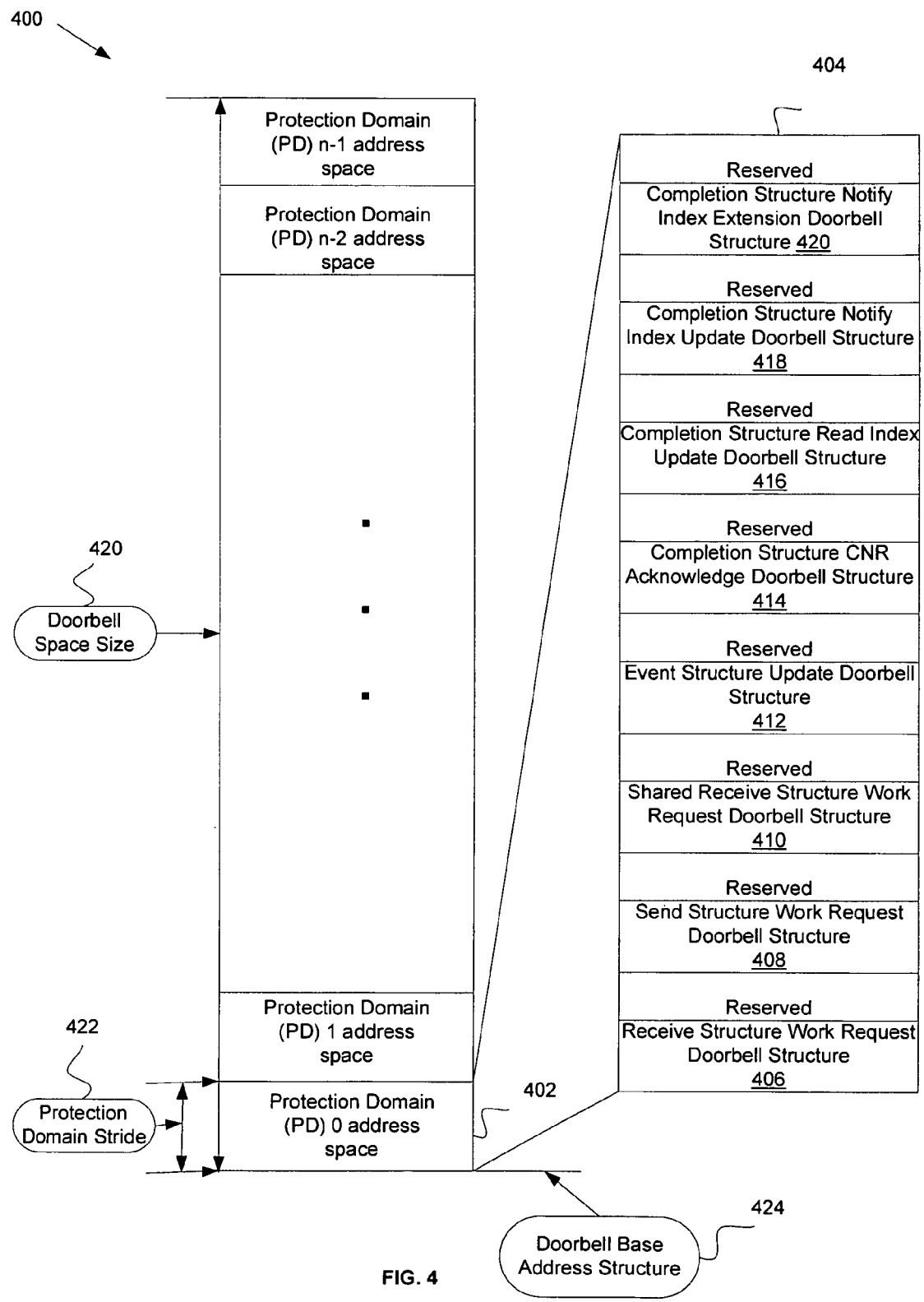
FIG. 4 illustrates partitioning of a doorbell space in accordance with certain embodiments.

FIG. 4 illustrates partitioning of a doorbell space 400 in accordance with certain embodiments. Doorbell space 400 is an example of doorbell space 150 (FIG. 1). The doorbell space 400 includes protection domains (e.g., 402), a doorbell structures size 420 that describes the size of the doorbell space 400 (e.g., number of bytes), a protection domain stride 422 (i.e., that indicates a size of a protection domain), and a doorbell base address structure 424.

The doorbell space 150 requirements may differ between computer systems built for different purposes. A doorbell base address structure 424 provides the base address of the doorbell space 150. To accommodate the different requirements, the RNIC defines a mechanism to change the power-on default value of the doorbell base address structure. In certain embodiments, the contents of the doorbell base address structure may be loaded from, for example, an Electrically Erasable Programmable Read-Only Memory (EEPROM) after power-on or reset, but prior to a PCI enumeration phase.

The program 108 issues a request to the I/O device driver 120, and then the I/O device driver 120 partitions the doorbell address space into "protection domains" (e.g., 402). Each protection domain is identified by a protection domain identifier. In particular, when a program 108 is associated with a protection domain, the program 108 is associated with the protection domain identifier of that protection domain. Then, that program 108 is allowed to write to the associated protection domain. A program 108 that is not associated with the protection domain is not allowed to write to that protection domain.

The I/O device 140 utilizes protection domain membership rules as the security mechanisms between the programs 108 or processes using the protection domains. The I/O device 140 enforces these strict protection domain membership rules. In certain embodiments, the rules are enforced by RNIC hardware. In certain embodiments, for the utilization of these security measures, the I/O device driver 120 ensures the doorbell space 150 allocated for each protection domain is also protected using the operating system memory protection facilities.

The data structures 126 associated with a program 108 are associated with one or more protection domains.

A protection domain stride structure 422 (e.g., register) is used to define the size of the doorbell space 400 allocated for each protection domain. In certain embodiments, the protection domain stride structure is set to an operating system page size for enforcement of security between the programs 108 in the different protection domains. In certain embodiments, the I/O device 140 supports protection domain stride values as low as 64 bytes and as high as 16 Kbytes. In certain embodiments, the protection domain stride value is a power of two.

On a given I/O device 140, the number of supported protection domains may be restricted by the size of the doorbell space 150 and the specified protection domain stride value. In certain embodiments, the following formula specifies a maximum number of usable protection domains (protection domains):

Usable Number of protection domains=Min {Maximum Number of supported protection domains, [Doorbell Space Size (Bytes)/Doorbell Protection Domain Stride(Bytes)]}

The doorbell space 150 is made up of doorbell structures. In certain embodiments, the doorbell structures are memory-mapped doorbell registers that reside in memory address space assigned to an RNIC during system initialization (e.g., a PCI device enumeration and resource assignment phase). In such embodiments, the RNIC specifies the characteristics of the required doorbell space 150 to a Basic Input/Output System (BIOS) and/or operating system using the doorbell base address structure 424 (e.g., a register) in the PCI configuration space.

Each protection domain (e.g., 402) has a set of doorbell structures 404. The doorbell structures 404 for a protection domain include a receive structure work request doorbell structure 406, a send structure work request doorbell structure 408, a shared receive structure work request doorbell structure 410, an event structure update doorbell structure 412, a completion structure completion notification request (CNR) acknowledge doorbell structure 414, a completion structure read index update doorbell structure 416, a completion structure notify index update doorbell structure 418, a completion structure notify index extension doorbell structure 420, and one or more reserved structures. In certain embodiments, doorbell structures 406-420 are doorbell registers.

In certain embodiments, certain doorbell structures are written using programmed I/O during post operations (i.e., when posting data to the doorbell structures). In particular, the receive structure work request doorbell structure 406, the send structure work request doorbell structure 408, and the shared receive work request doorbell structure 410 are written during post operations. In certain embodiments, the completion structure notify index update doorbell structure 418 and the completion structure notify index extension doorbell structure 420 are written when arming the completion structure for notification. The completion structure CNR acknowledge doorbell structure 414 is used for acknowledging completion notification by either an RDMA Verbs Provider 310 or an RDMA Verbs Driver 320. The completion structure read index update doorbell structure 416 is used by an RDMA Verbs Provider 310 or an RDMA Verbs Driver 320 to update the completion structure 240 read indicator. The event structure update doorbell structure is used to update the event structure 260 read indicator and to modify the event structure state.

Figure 5:
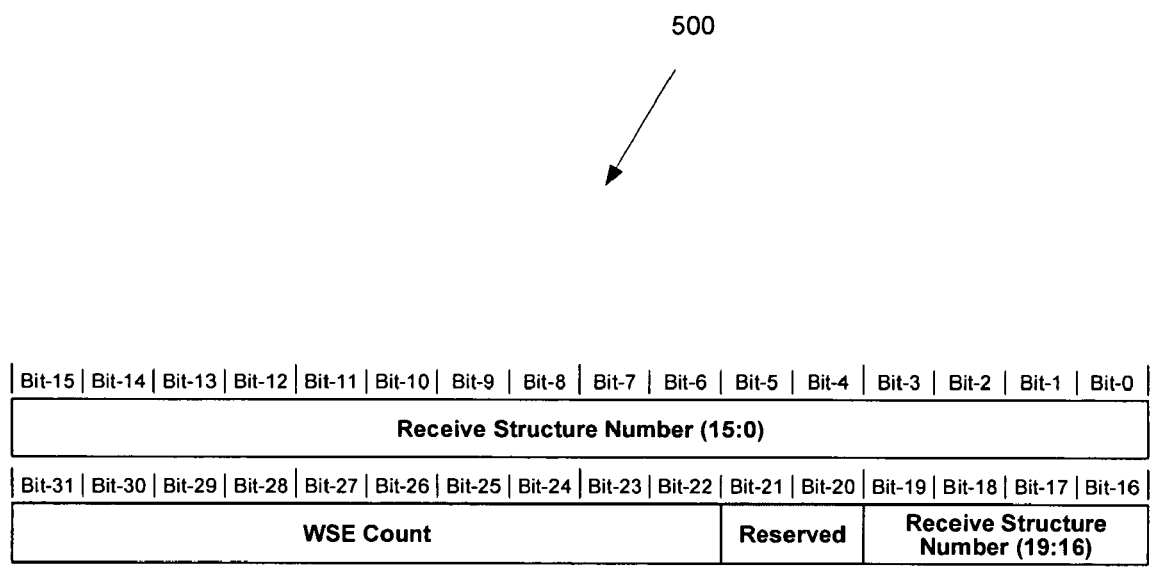
FIG. 5 illustrates a receive structure work request doorbell structure in accordance with certain embodiments.

FIG. 5 illustrates a receive structure work request doorbell structure 500 in accordance with certain embodiments. Doorbell structure 500 is an example of doorbell structure 406. The receive structure work request doorbell structure 500 is used to inform RNIC that one or more work structure elements (WSEs) are posted to a specified receive structure 220. In certain embodiments, receive structure work request doorbell structure 500 is a memory-mapped register that is located at offset 0x000 of the doorbell space allocated for each protection domain. In certain embodiments, the 32-bit data written to the doorbell structure 500 specifies both the receive structure number and the number of work structure elements stored.

Table A illustrates fields of receive structure work request doorbell structure 500 in accordance with certain embodiments. In certain embodiments, access rights may be write-only (WO).

TABLE A

| Bits | Access Rights | Default Value | Description |
|---|---|---|---|
| 19:0 | WO | 0...0 | Receive Structure Number: This 20-bit field specifies Structure Pair number this receive structure is associated with. |
| 21:20 | WO | 00 | Reserved: Set to zero. |
| 31:22 | WO | 0...0 | WSE Count: This 10-bit field specifies the number of stored Work Structure Elements (WSEs). Valid range for this field is 1-1023. A value of zero in this field is reserved and the expected behavior is undefined. |

In certain embodiments, RNIC also decodes the physical address to calculate the doorbell protection domain. If the calculated doorbell protection domain is not permissive and does not match to the protection domain assigned to a structure pair, then that particular doorbell write is ignored. Similarly, if the specified receive structure 220 is in error state or does not exist, then the doorbell write is ignored. In certain embodiments, the receive structure work request doorbell structure 500 is a write-only register and the returned data is undefined for reads.

Figure 6:
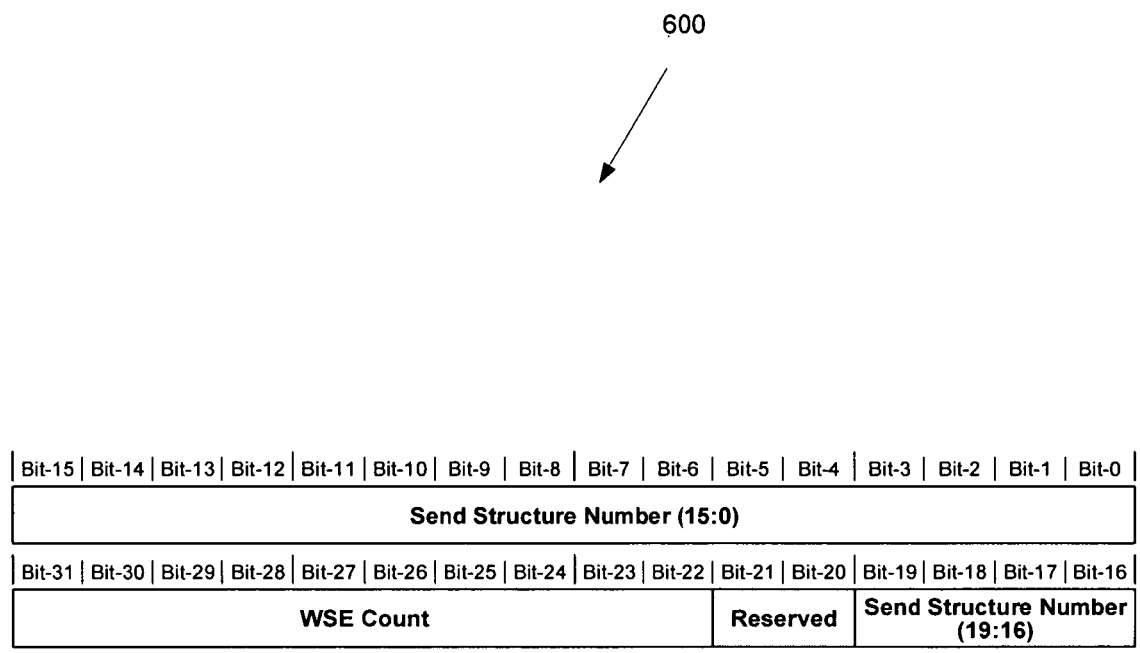
FIG. 6 illustrates a send structure work request doorbell structure in accordance with certain embodiments.

FIG. 6 illustrates a send structure work request doorbell structure 600 in accordance with certain embodiments. Doorbell structure 600 is an example of doorbell structure 408. The send structure work request doorbell structure 600 is used to inform RNIC that one or more work structure elements are stored to a specified send structure 210. In certain embodiments, the send structure work request doorbell structure 600 is a memory-mapped register that is located at offset 0x008 of the doorbell space allocated for each protection domain. In certain embodiments, the 32-bit data written to this doorbell structure 600 specifies both the send structure number and the number of work structure elements stored.

Table B illustrates fields of send structure work request doorbell structure 600 in accordance with certain embodiments.

TABLE B

| Bits | Access Rights | Default Value | Description |
|---|---|---|---|
| 19:0 | WO | 0...0 | Send Structure Number: This 20-bit field specifies Structure Pair number this send structure is associated with. |
| 21:20 | WO | 00 | Reserved: Set to zero. |
| 31:22 | WO | 0...0 | WSE Count: This 10-bit field specifies the number of stored Work Structure Elements (WSEs). Valid range for this field is 1-1023. A value of zero in this field is reserved and the expected behavior is undefined. |

In certain embodiments, RNIC also decodes the physical address to calculate the doorbell protection domain. If the calculated doorbell protection domain is not permissive and does not match to the protection domain assigned to the structure pair, then that particular doorbell write is ignored. Similarly, if the specified send structure 210 is in error state or does not exist, then the doorbell write is ignored. In certain embodiments, the send structure work request doorbell structure 600 is a write-only register and the returned data is undefined for reads.

Figure 7:
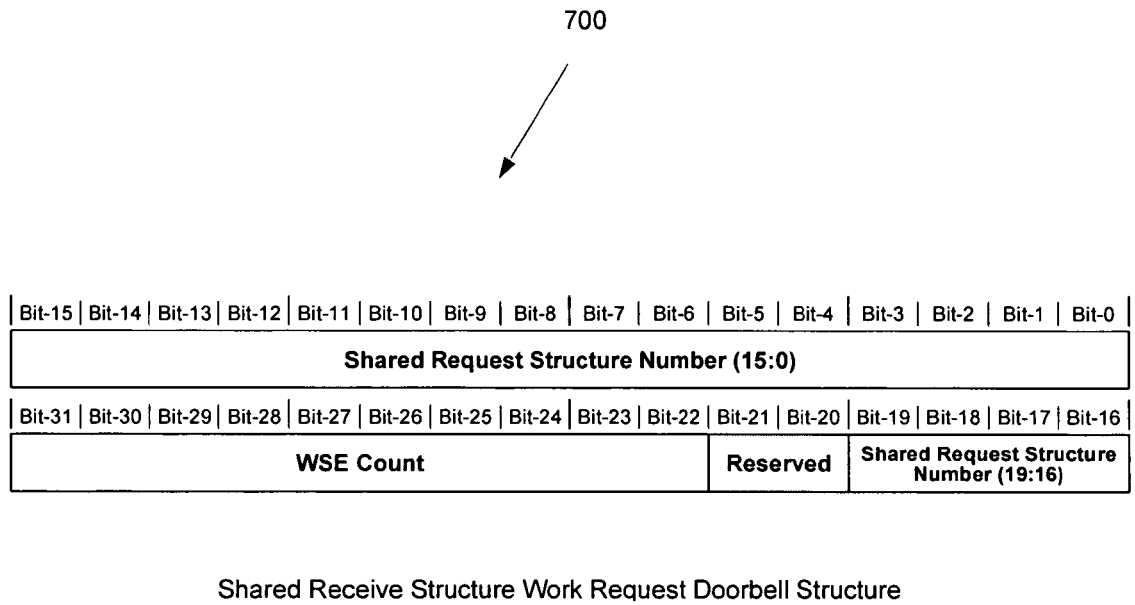
FIG. 7 illustrates a shared receive structure work request doorbell structure in accordance with certain embodiments.

FIG. 7 illustrates a shared receive structure work request doorbell structure 700 in accordance with certain embodiments. Doorbell structure 700 is an example of doorbell structure 410. The shared receive structure work request doorbell structure 700 is used to inform RNIC that one or more work structure elements are stored to the specified shared receive structure 250. In certain embodiments, the shared receive structure work request doorbell structure 700 is a memory-mapped register that is located at offset 0x010 of the doorbell space allocated for each protection domain. In certain embodiments, the 32-bit data written to the shared receive structure work request doorbell structure 700 specifies both the shared receive structure 250 number and the number of work structure elements stored.

Table C illustrates fields of send shared receive structure work request doorbell structure 700 in accordance with certain embodiments.

TABLE C

| Bits | Access Rights | Default Value | Description |
|---|---|---|---|
| 19:0 | WO | 0...0 | Shared receive structure Number: This 20-bit field specifies the number of this shared receive structure. |
| 21:20 | WO | 00 | Reserved: Set to zero. |
| 31:22 | WO | 0...0 | WSE Count: This 10-bit field specifies the number of stored Work Structure Elements (WSEs). Valid range for this field is 1-1023. A value of zero in this field is reserved and the expected behavior is undefined. |

In certain embodiments, RNIC also decodes the physical address to calculate the doorbell protection domain. If the calculated doorbell protection domain is not permissive and does not match to the protection domain assigned to the shared receive structure 250, then that particular doorbell write is ignored. Similarly, if the specified shared receive structure 250 is in error state or does not exist, then the doorbell write is ignored. In certain embodiments, the shared receive structure work request doorbell structure 700 is a write-only register and the returned data is undefined for reads.

Figure 8:
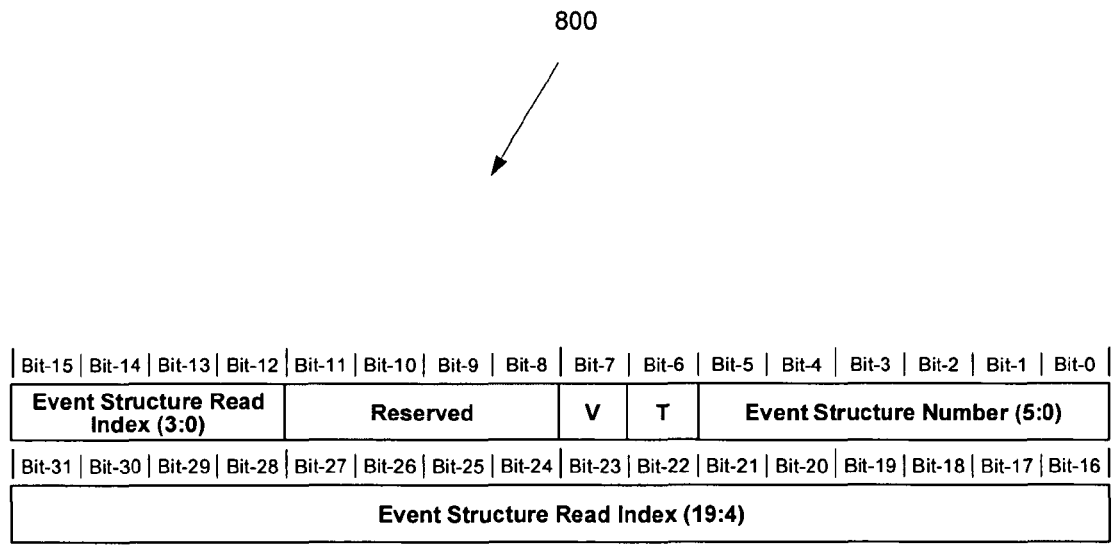
FIG. 8 illustrates an event structure work request doorbell structure in accordance with certain embodiments.

FIG. 8 illustrates an event structure work request doorbell structure 800 in accordance with certain embodiments. Doorbell structure 800 is an example of doorbell structure 312. The event structure update structure is used to update an event structure read index (i.e., an index into an array) and an event structure state. In certain embodiments, the structure work request doorbell structure 800 is a memory-mapped register that is located at offset 0x018 of the doorbell space allocated for Protection Domain-0 (permissive protection domain). In certain embodiments, the 32-bit data written to this doorbell structure 800 specifies an event structure number, control flags, and an event structure read index.

Table D illustrates fields of event structure work request doorbell structure 800 in accordance with certain embodiments.

TABLE D

| Bits | Access Rights | Default Value | Description |
|---|---|---|---|
| 5:0 | WO | 0...0 | Event Structure Number: This 6-bit field specifies the number of the selected Event Structure. |
| 6 | WO | 0...0 | Toggle: This bit specifies whether to toggle Event Structure state (Armed→Unarmed, or Unarmed→Armed). Set to 1 to toggle Event Structure state. |
| 7 | WO | 0...0 | Valid: This bit specifies whether the Event Structure Read Index is valid. Set to 1 for valid Event Structure Read Index. |
| 11:8 | WO | 0...0 | Reserved: Set to zero. |
| 31:12 | WO | 0...0 | Event Structure Read Index: This field specifies the current Event Structure Read Index of the Event Structure specified by the Event Structure Number. This field is valid when bit 7 is set to 1. |

If the calculated doorbell protection domain is not zero (i.e., a permissive protection domain), then writes to this event structure work request doorbell structure 800 are ignored. Similarly, if the specified event structure 260 is in an undefined state, then writes to this event structure work request doorbell structure 800 are ignored. In certain embodiments, the event structure work request doorbell structure 800 is a write-only register and the returned data is undefined for reads.

Figure 9:
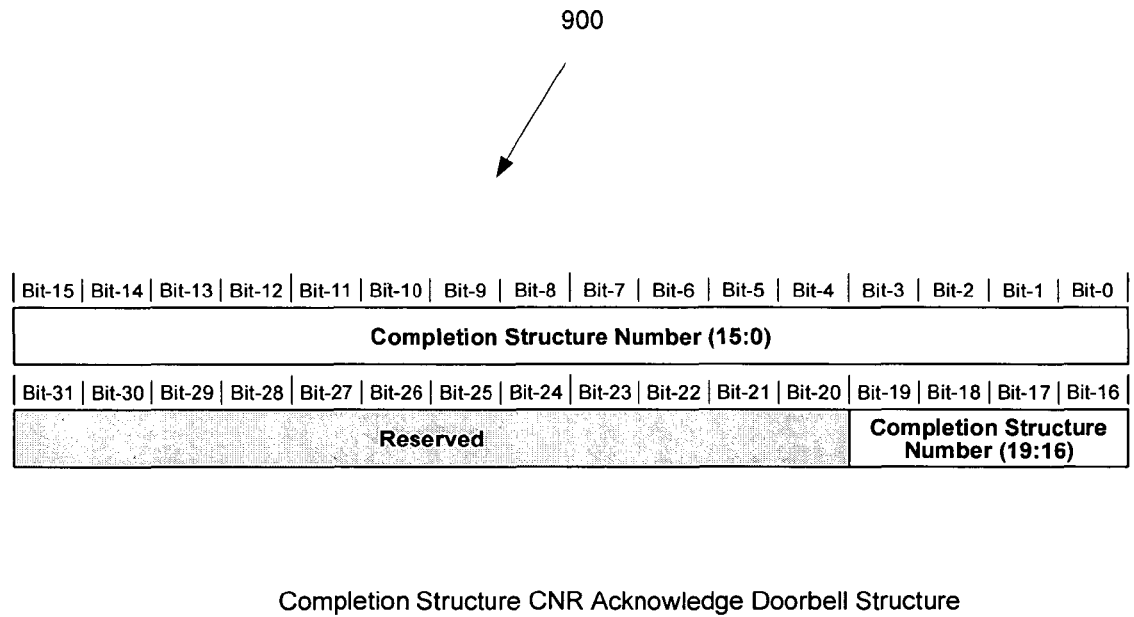
FIG. 9 illustrates a completion structure CNR acknowledge doorbell structure in accordance with certain embodiments.

FIG. 9 illustrates a completion structure CNR acknowledge doorbell structure 900 in accordance with certain embodiments. Doorbell structure 900 is an example of doorbell structure 414. The completion structure CNR acknowledge doorbell structure 900 is used to inform RNIC that an outstanding completion notification event for this completion structure is processed. In certain embodiments, the completion structure CNR acknowledge doorbell structure 900 is a memory-mapped register that is located at offset 0x020 of the doorbell space allocated for Protection Domain-0 (permissive protection domain). In certain embodiments, the 32-bit data written to this completion structure CNR acknowledge doorbell structure 900 specifies both the completion structure number and the control field.

Table E illustrates fields of completion structure CNR acknowledge doorbell structure 900 in accordance with certain embodiments.

TABLE E

| Bits | Access Rights | Default Value | Description |
|---|---|---|---|
| 19:0 | WO | 0...0 | Completion Structure Number: This 20-bit field specifies the number of the selected Completion Structure. |
| 31:20 | WO | 0...0 | Reserved: Set to zero. |

In certain embodiments, if the calculated doorbell protection domain is not zero (Permissive protection domain), then writes to the completion structure CNR acknowledge doorbell structure 900 are ignored. Similarly, if the specified completion structure 240 is in an error state or an undefined state, then writes to this completion structure CNR acknowledge doorbell structure 900 are ignored. In certain embodiments, the completion structure CNR acknowledge doorbell structure 900 is a write-only register and the returned data is undefined for reads.

Figure 10:
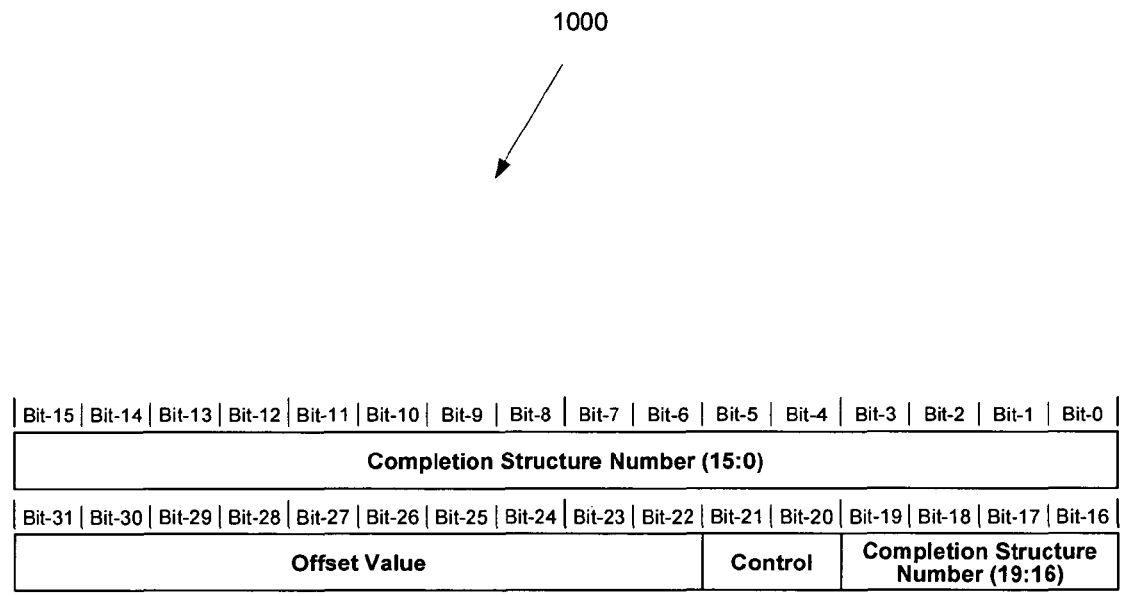
FIG. 10 illustrates a completion structure read index update structure in accordance with certain embodiments.

FIG. 10 illustrates a completion structure read index update structure 1000 in accordance with certain embodiments. Doorbell structure 1000 is an example of doorbell structure 416. The completion structure read index update structure 1000 is used to advance the read index of this completion structure 250. In certain embodiments, the completion structure read index update structure 1000 is a write-only register that is located at offset 0x028 of the doorbell space allocated for each protection domain. In certain embodiments, the 32-bit data written to this completion structure read index update structure 1000 specifies the completion structure number, offset value, and an update control field.

Table F illustrates fields of completion structure read index update structure 1000 in accordance with certain embodiments.

TABLE F

| Bits | Access Rights | Default Value | Description |
|---|---|---|---|
| 19:0 | WO | 0...0 | Completion Structure Number: This 20-bit field specifies the number of the selected Completion Structure. |
| 21:20 | WO | 00 | Control: This 2-bit field defines the magnitude of the offset value field. Valid bit encodings and the function they define are as follows:<br><br>Bits — Description<br>00 — Completion Structure (CS) Read Index = CS Read Index + Offset value<br>01 — CS Read Index = CS Read Index + (1024 * Offset Value)<br>Others — Reserved. CS Read Index does not change |
| 31:22 | WO | 0...0 | Offset Value: This 10-bit field specifies the Read Index advancement offset. This field specifies either the least significant 10-bits of the offset, or the most significant 10-bits as defined by the control field. |

In certain embodiments, if the specified completion structure 240 is in error or undefined state, then writes to this completion structure read index update structure 1000 are ignored. In certain embodiments, the completion structure read index update structure 1000 is a write-only register and the returned data is undefined for reads.

Figure 11:
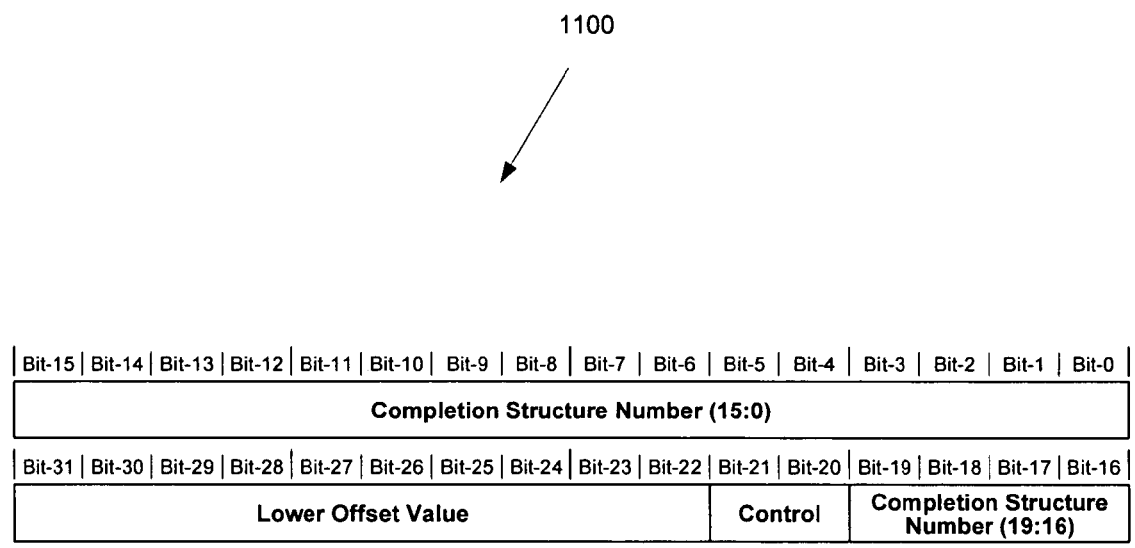
FIG. 11 illustrates a completion structure notify index update doorbell structure with certain embodiments.

FIG. 11 illustrates a completion structure notify index update doorbell structure 1100 with certain embodiments. Doorbell structure 1100 is an example of doorbell structure 418. The completion structure notify index update doorbell structure 1100 is used to advance the notify index of this completion structure 240. The advancement of the completion structure 240 notify index is relative to the completion structure 240 read index. To advance the completion structure 240 notify index up to 1023 completion structure entries locations with respect to completion structure 240 read index, then a single write to this completion structure notify index update doorbell structure 1100 is sufficient. However, if an advancement of more than 1023 locations is required, then the upper offset value is written to the completion structure 240 context through the completion structure notify index extension doorbell structure 320 first. In certain embodiments, the completion structure notify index update doorbell structure 1100 is a write-only register that is located at offset 0x030 of the doorbell space allocated for each protection domain. In certain embodiments, the 32-bit data written to this completion structure notify index update doorbell structure 1100 specifies the completion structure number, lower offset value, and control fields.

Table G illustrates fields of completion structure notify index update doorbell structure 1100 in accordance with certain embodiments.

TABLE G

| Bits | Access Rights | Default Value | Description |
|---|---|---|---|
| 19:0 | WO | 0...0 | Completion Structure Number: This 20-bit field specifies the number of the selected Completion Structure. |
| 21:20 | WO | 00 | Control: This 2-bit field defines the requested "Completion Notification Request" type, and how the offset value should be calculated. Valid bit encodings and the functions they define are as follows:<br>Bits Description<br>00 Completion Structure (CS) Notify Index = CS Read Index + Lower Offset value CS Notify Type = Solicited<br>01 CS Notify Index = CS Read Index + (1024 * Upper Offset Value) + Lower Offset Value CS Notify Type = Solicited<br>10 CS Notify Index = CS Read Index + Lower Offset value CS Notify Type = Any<br>11 CS Notify Index = CS Read Index + (1024 * Upper Offset Value) + Lower Offset Value CS Notify Type = Any |
| 31:22 | WO | 0...0 | Lower Offset Value: This 10-bit field specifies the Notify Index advancement offset. |

In certain embodiments, if the specified completion structure 240 is in error or undefined state, then writes to this completion structure notify index update doorbell structure 1100 are ignored. In certain embodiments, the completion structure notify index update doorbell structure 1100 is a write-only register and the returned data is undefined for reads.

Figure 12:
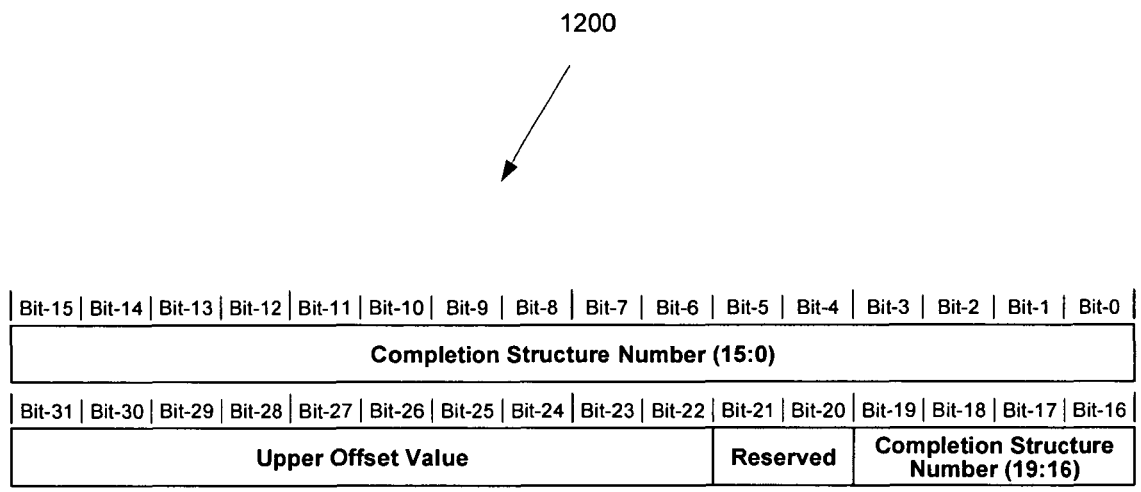
FIG. 12 illustrates a completion structure notify index extension doorbell structure in accordance with certain embodiments.

FIG. 12 illustrates a completion structure notify index extension doorbell structure 1200 in accordance with certain embodiments. Doorbell structure 1200 is an example of doorbell structure 420. The completion structure notify index extension doorbell structure 1200 is used to store the upper offset value in the selected completion structure 240 context. This value is optionally used in subsequent writes to the completion structure notify index update doorbell structure 418. In certain embodiments, the completion structure notify index extension doorbell structure 1200 is a write-only register that is located at offset 0x038 of the doorbell space allocated for each protection domain. In certain embodiments, the 32-bit data written to this completion structure notify index extension doorbell structure 1200 specifies the completion structure number, advance offset, and an update control field.

Table H illustrates fields of completion structure notify index extension doorbell structure 1200 in accordance with certain embodiments.

TABLE H

| Bits | Access Rights | Default Value | Description |
|---|---|---|---|
| 19:0 | WO | 0...0 | Completion Structure Number: This 20-bit field specifies the number of the selected Completion Structure. |
| 21:20 | WO | 00 | Reserved: Set to zero. |
| 31:22 | WO | 0...0 | Upper Offset Value: This 10-bit field specifies the Notify Index advancement upper offset value. |

In certain embodiments, if the specified completion structure 240 is in error or undefined state, then writes to this completion structure notify index extension doorbell structure 1200 are ignored. In certain embodiments, this completion structure notify index extension doorbell structure 1200 is a write-only register and the returned data is undefined for reads.

In certain embodiments, one doorbell structure (e.g., register) may be used for update by reducing the number of completion structures supported. In certain embodiments, there is no protection domain associated with the completion structure 240, and the I/O device driver 120 selects the appropriate protection domain for this doorbell write.

Figure 13:
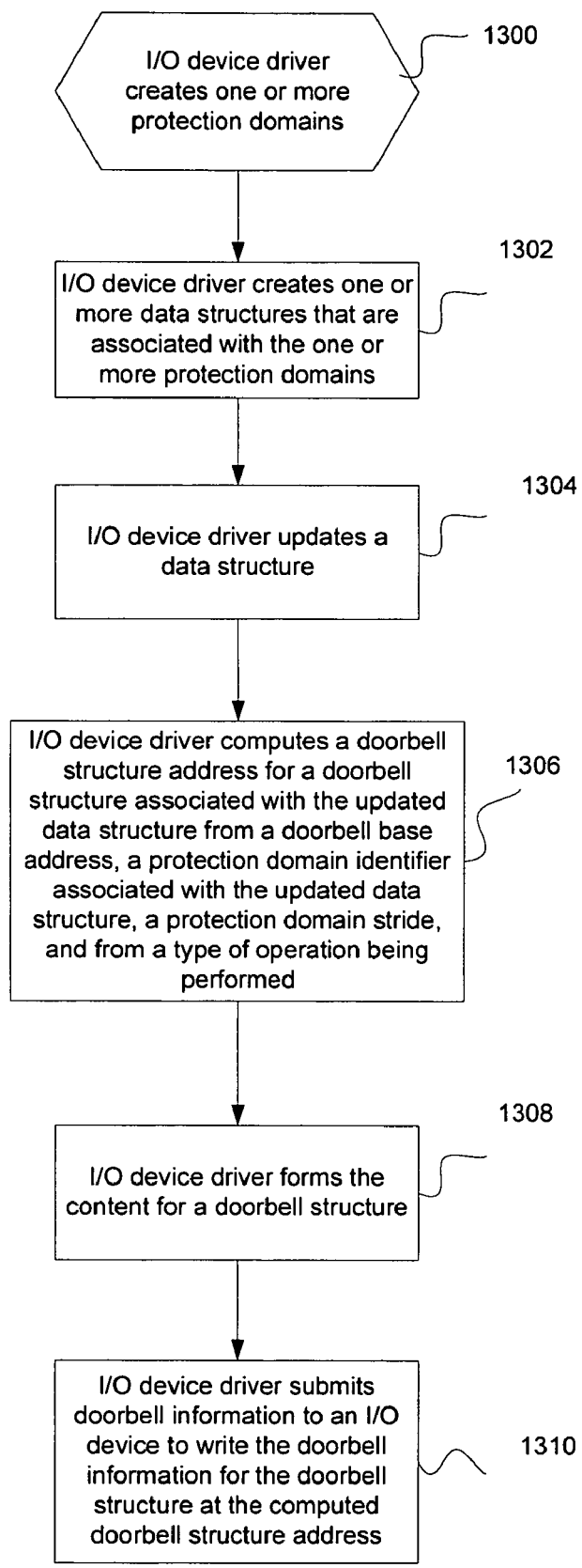
FIG. 13 illustrates operations performed by a program in accordance with certain embodiments.

FIG. 13 illustrates operations performed by an I/O device driver 120 in accordance with certain embodiments. Control begins at block 1300 with the I/O device driver 120 creating one or more protection domains. In certain embodiments, the operations are performed by the I/O device driver 120 in response to requests from a program 108. In certain embodiments, the program 108 issues a request to the kernel for a protection domain identifier. The kernel obtains the protection domain identifiers from the I/O device driver 120 and returns the protection domain identifiers to the program 108. In block 1302, the I/O device driver 120 creates one or more data structures 126 that are associated with the one or more protection domains. In block 1304, the I/O device driver 120 updates a data structure 126. In block 1306, the I/O device driver 120 computes a doorbell structure address for a doorbell structure associated with the updated data structure from a doorbell base address, a protection domain identifier associated with the updated data structure 126, a protection domain stride, and from a type of operation being performed. In certain embodiments, the I/O device driver 120 computes the doorbell structure address when the type of operation is a post operation, arm completion structure for notification operation, or update operation is performed. In block 1308, the I/O device driver 120 forms the content for a doorbell structure. In block 1310, the I/O device driver 120 submits doorbell information to the I/O device 140 to write the doorbell information for the doorbell structure at the computed doorbell structure address. The doorbell information includes the computed doorbell structure address and content for the doorbell structure. Thus, the I/O device driver 120 attempts to write the appropriate contents of the doorbell structure at a location with the appropriate offset from the base doorbell address for the protection domain.

In certain embodiments, to compute a doorbell address for a program 108 with multiple protection domains, the RDMA Verbs Provider 310 and RDMA Verbs Driver 320 keep a table of protection domain identifiers associated with possible structure pair identifiers. The user-level Verbs Provider 310 may use a protection domain value of, for example, −1, for the data structures 126 (e.g., structure pairs 200) that were not created by the program 108 and this will allow the user-level Verbs Provider 310 to perform a check of the protection domain value before writing to the doorbell structures in a protection domain. This prevents writing doorbell structures for the structure pairs 200, shared receive structures 250, and completion structures 240 not created by the program 108. Furthermore, a single process may have multiple protection domains.

Figure 14:
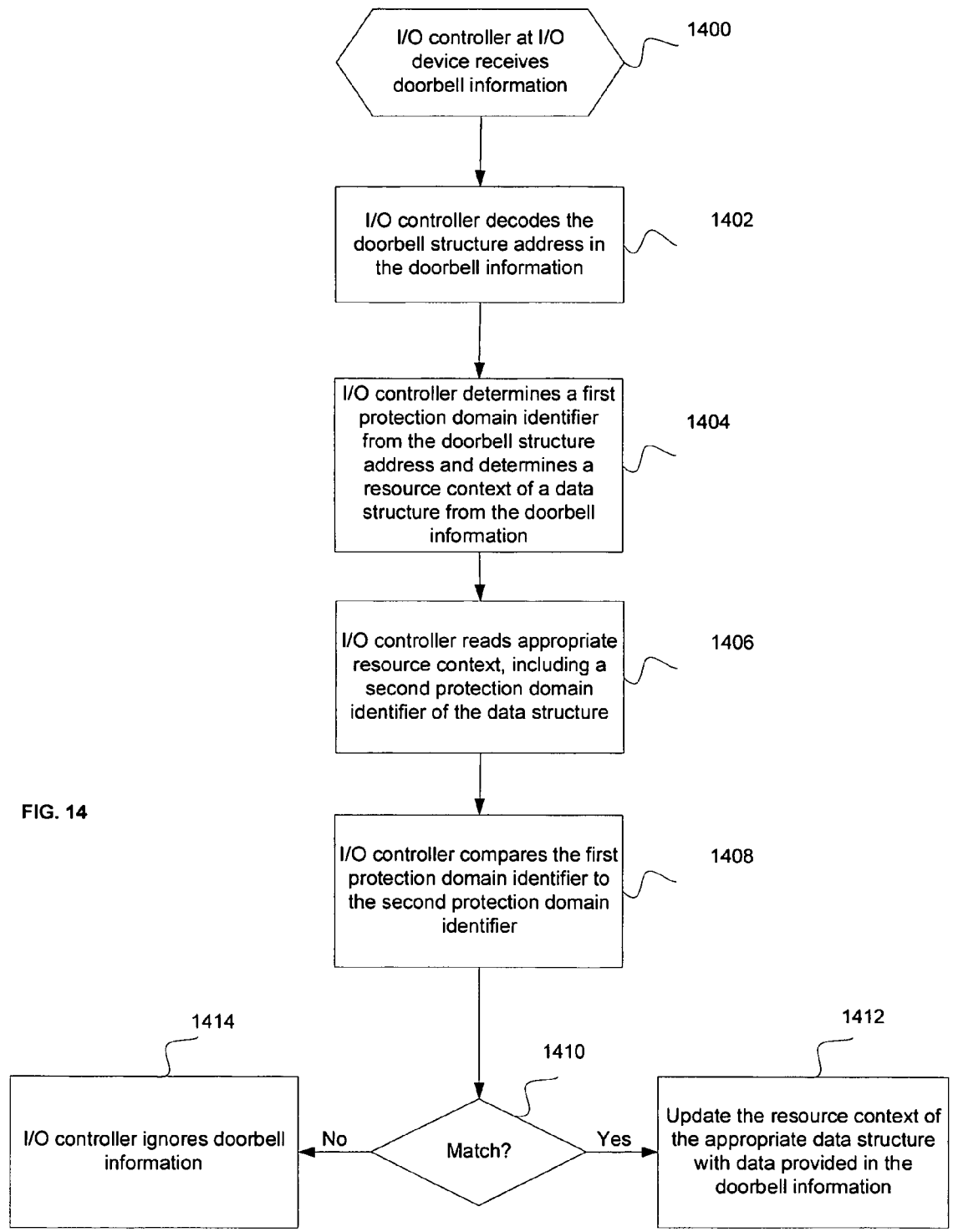
FIG. 14 illustrates operations performed by an I/O controller in accordance with certain embodiments.

FIG. 14 illustrates operations performed by an I/O controller 142 in accordance with certain embodiments. Control begins at block 1400 with the I/O controller 142 receiving doorbell information (e.g., the doorbell address and the doorbell structure content) from the host program 108. In certain embodiments, the I/O controller 142 stores doorbell information regarding writes received from the host computer 102 into a write structure (e.g., a First In First Out (FIFO) queue). The information stored in a write structure entry includes the doorbell structure address and the contents of the doorbell structure. The I/O controller 142 then determines whether to authorize data to be written to the doorbell structure.

In block 1402, the I/O controller 142 decodes a doorbell structure address from the doorbell information. In block 1404, the I/O controller 142 determines a first protection domain identifier from the doorbell structure address and determines a resource context of a data structure 126 from the doorbell information. The resource context includes information about the data structure 126, such as the read indicator, write indicator, base address of the data structure, etc. Each data structure 126 has its own resource context (e.g., structure pair 200 context, shared request structure 250 context, completion structure 240 context, event structure 260 context). From the doorbell structure address, the I/O controller 142 computes the first protection domain identifier using the protection domain stride and the doorbell base address values.

In block 1406, the I/O controller 142 reads an appropriate resource context, including a second protection domain identifier of the data structure. In block 1408, the I/O controller 142 compares the first protection domain identifier computed in response to decoding the doorbell address (block 1404) with the second protection domain identifier stored in the resource context (block 1406) that is to be updated. If the first protection domain identifier matches the second protection domain identifier of the doorbell structure 126 (e.g., structure pair 200, shared receive structure 250, completion structure 240 or event structure 260) for which the doorbell content was targeted, then the data to be written to the appropriate doorbell structure is authorized.

In block 1410, if there is a match between the first and second protection domain identifiers, processing continues to block 1412, otherwise, processing continues to block 1414. In block 1412, the I/O controller 142 updates the resource context of the appropriate data structure 126 with data in the doorbell information provided in the doorbell structure content. In block 1414, the I/O controller 142 ignores the doorbell information. Thus, if there is doorbell authorization, the appropriate resource context (e.g., structure pair 200 context, shared request structure 250 context, completion structure 240 context, event structure 260 context) is updated in the appropriate doorbell structure.

Figure 15:
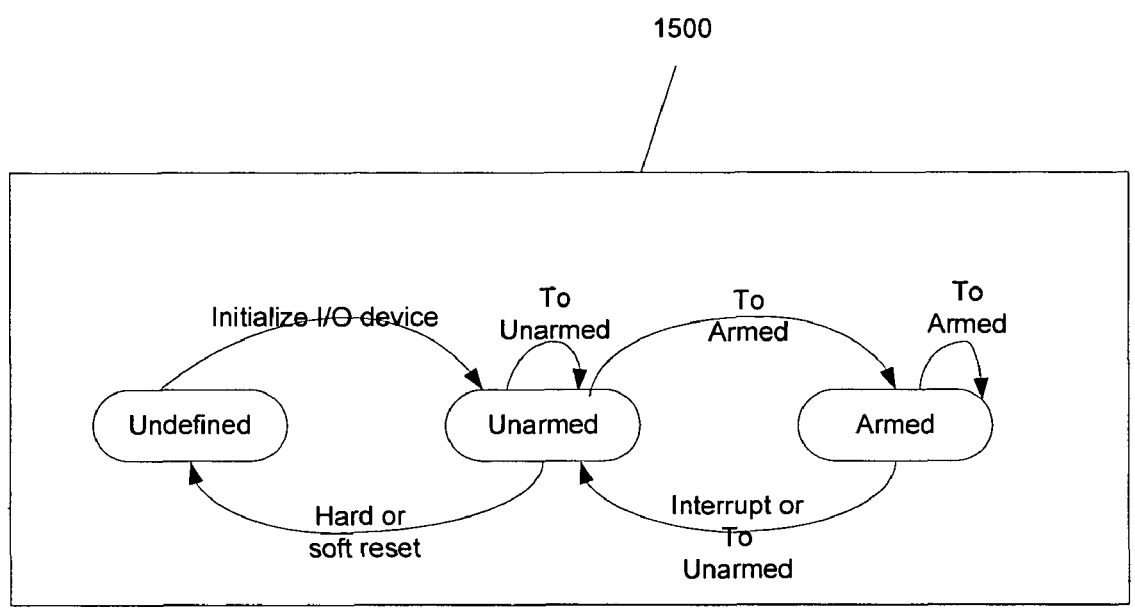
FIG. 15 illustrates a state transition diagram for an event structure in accordance with certain embodiments.

FIG. 15 illustrates a state transition diagram 1500 in accordance with certain embodiments. Diagram 1500 shows event structure states and state transitions for event structures 260. There are three states: undefined, unarmed, and armed.

The power-on default is the undefined state. The undefined state reflects the undefined status of the event structure 260. If the I/O device 140 desires to post (i.e., write) to the event structure 260 and finds the event structure state as undefined, the I/O device 140 shuts down. The I/O device 140 may also cause the event structure 260 to enter the undefined state if, for example, a catastrophic error is detected (e.g., event structure overflow). In the undefined state, no entry is written in the event structure 260.

In the "unarmed" state, the I/O device 140 posts data to the event structure 260 whenever desired, but the I/O device 140 does not signal an event structure interrupt, which may be described as an interrupt signaling that an entry has been written to the event structure 260. Event structure 260 overflows may also be detected while in the unarmed state. In certain embodiments, the event structure 260 is large enough to avoid overflows during normal operation. In certain embodiments, upon detecting an overflow, the I/O device 140 may either shut down or signal an out-of-band event to resize the event structure 260. Thus, if there is an overflow, the event structure 260 may be resized. In certain embodiments, if there is an overflow, the I/O device 140 and device driver 120 may switch to using a larger event structure 260. Also, in the unarmed state, if there is a "read indicator update," the state loops back to the unarmed state.

In the "armed" state, the I/O device 140 posts data to the event structure 260 whenever desired. However, if the write indicator is already ahead, or advances ahead, of the read indicator and (optionally) an interrupt moderation timer expires, the I/O device 140 signals an event structure interrupt and transitions the event structure state to the unarmed state. Event structure overflows may also be detected while in the armed state.

From the undefined state, when the I/O device driver 120 allocates memory for the event structure 260 and notifies the I/O device of the location of the event structure 260 (illustrated as "initialize I/O device"), there is a transition to the unarmed state. From the unarmed state, when the I/O device driver 120 enables an I/O device 140 to generate interrupts, there is a transition to the armed state. The state transition from the armed state to the unarmed state (illustrated as "Interrupt or to Unarmed") is taken simultaneously with signaling of an event structure interrupt by an I/O device 140.

During normal operation, an event structure 260 may continuously loop between the unarmed and armed states. When the I/O device driver 120 is ready to receive an event structure interrupt, the I/O device driver 120 arms the event structure 260 (i.e., by setting the event structure state to armed), and when the I/O device 140 signals an event structure interrupt, the event structure 260 is armed (i.e., by setting the event structure state to unarmed). The I/O device driver 120 may implement any technique to determine when to arm the event structure 260 (e.g., arm after one or more entries have been read). The arming and unarming of the event structure 260, along with proper advancement of the write indicator and read indicator, throttles the event structure interrupt signaling rate. Although the I/O device 140 is said to generate the event structure interrupt, in certain embodiments, the event structure interrupt is generated by a Remote Direct Memory Access (RDMA) Network Interface Controller (RNIC).

Figure 16:
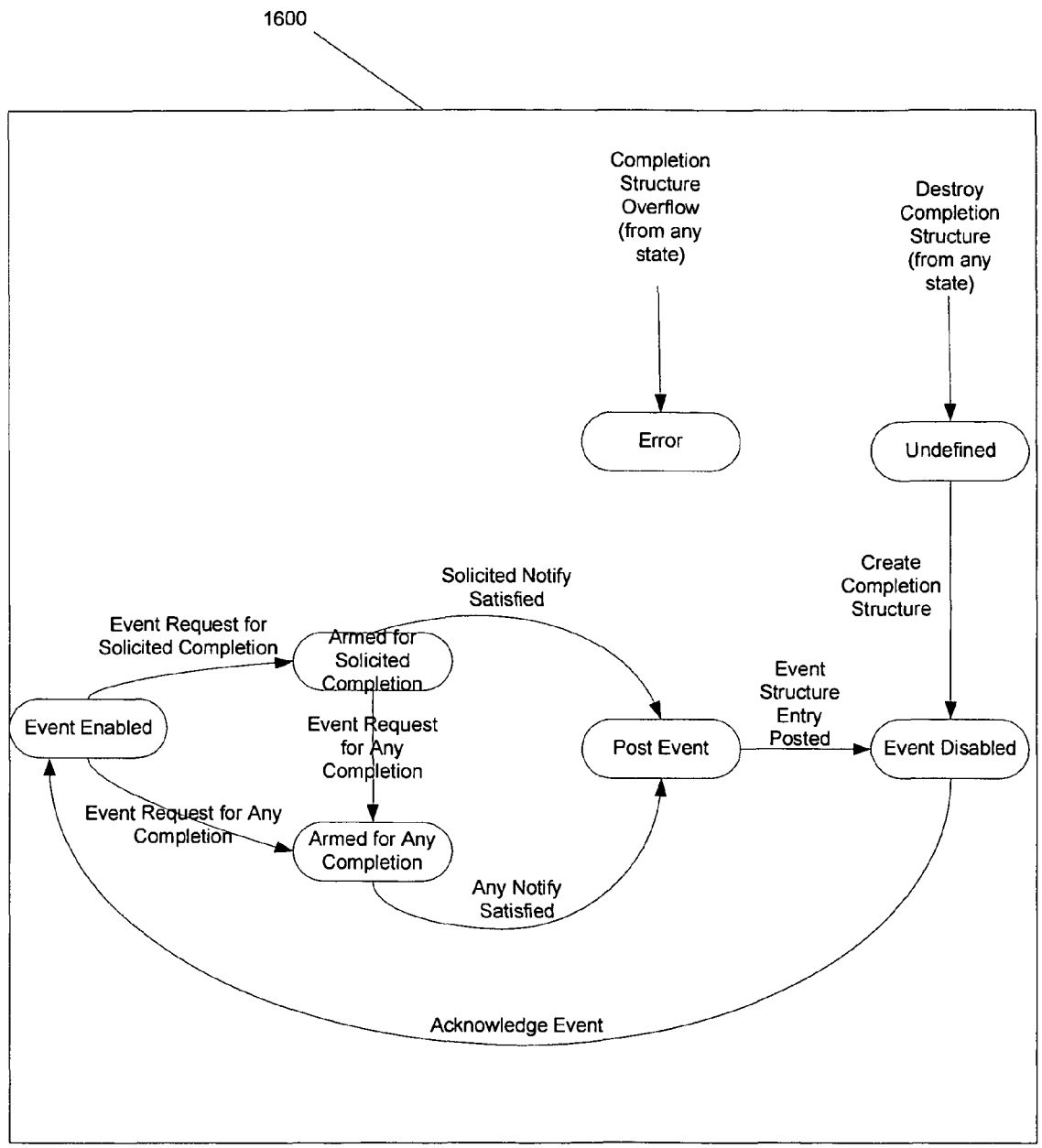
FIG. 16 illustrates a state transition diagram for a completion structure in accordance with certain embodiments.

FIG. 16 illustrates a state transition diagram 1600 for a completion structure 240 in accordance with certain embodiments. Different completion structures 240 may be attached to an event structure 260. If the completion structure state is armed and the event structure state is armed, then an event structure entry may be stored in the event structure 260 and an interrupt is issued.

The "destroy completion structure" and "create completion structure" state transitions are controlled by the corresponding administrative commands initiated by, for example, an RDMA Verbs Driver 320. Similarly, the "event request for solicited completion", "event request for any completion", and "acknowledge event" state transitions are initiated by completion structure doorbell writes (which are writes to the doorbell structure) by the I/O device driver 120.

The "solicited completion structure event posted", "any completion structure event posted", and "event structure entry posted" state transitions are caused by internal I/O device driver 140 actions. In particular, for "solicited completion structure event posted" and "any completion structure event posted", the state transitions depend on the current state of the completion structure 240. If the completion structure 240 is in "Event Disabled" or "Event Enabled" state, then for both "solicited completion structure event posted" and "any completion structure event posted" actions, the completion structure 240 remains in the same state (not shown in FIG. 16). If the completion structure 240 is in "armed for solicited completion" state, then on the "solicited completion structure event posted" state transition, the completion structure 240 goes into the "Post Event" state. If the completion structure 240 is in the "Armed for Any Completion" state, then on the "any completion structure event posted" state transition, the completion structure 240 goes to the "Post Event" state. The "event structure entry posted" state transition moves from the "Post Event" state to the "Event Disabled" state.

Within the completion structure 240 operations context, the word "event" may be used as a short hand notation for "completion event" or "completion notification event".

The power-on default is the undefined state. The undefined state reflects the undefined status of the completion structure 240. If a structure pair 200 with its send structure 210 and/or receive structure 220 attached to the completion structure 240 tries to post a completion to a completion structure 240 in the undefined state, the I/O device 140 places that structure pair 200 into the error state. No completions are posted to the completion structure 240 while in the undefined state. Writes to the completion structure doorbell structures are also ignored in the undefined state.

When the I/O device 140 detects a "CS Overflow" or "CSE Address Translation Error", the I/O device 140 places the completion structure 240 in its error state. If a structure pair 200 with its send structure 210 and/or receive structure 220 attached to the completion structure 240 tries to post a completion to a completion structure 240 in the error state, the I/O device driver 140 places that structure pair 200 into the error state. Writes to the completion structure doorbell structures are ignored and completions are not posted to the completion structure 240 while in the error state.

The completion structure 240 enters the event disabled state when the completion structure 240 is created. The I/O device driver 140 posts completions (e.g., in the form of completion structure entries) while in the event disabled state. However, no completion notification events (e.g., in the form of event structure entries) are posted. The completion structure 240 transitions to the event enabled state when the I/O device driver 120 acknowledges receipt of the last posted event by writing to the completion structure doorbell structure. The completion structure doorbells that advance the notify index are ignored during the event disabled state.

The I/O device driver 140 posts completions in the event enabled state. However, no completions notification events are posted. The completion structure 240 transitions to the "armed for solicited event" or "armed for any event" state when the I/O device driver 120 requests a completion notification event by writing to the completion structure doorbell structures. The "type" of the completion notification request determines the resulting state of the completion structure 240.

The I/O device driver 140 posts completions in the armed for solicited completion state. Completions notification events are not posted while the completion structure 240 is in the armed for solicited completion state. The completion structure 240 transitions to the "post event" state when the notification request is satisfied. A "solicited" completion notification request is satisfied when (1) cq_last_sol is valid, and (2) cq_notify is valid, and (3) cq_notify type is "solicited", and (4) cq_last_sol index is at or past the cq_notify index, where cq_last_sol and cq_notify are different pointers to the elements of a completion structure 240. A transition to "armed for any completion" is taken if the I/O device driver 120 changes the pending notification type to "any completion" through a completion structure doorbell structure write.

The I/O device driver 140 posts completions while in the armed for any completion state. Completions notification events are not posted while the completion structure 240 is in this state. The completion structure 240 transitions to the "post event" state when the notification request is satisfied. "Any" completion notification request is satisfied when (1) cq_last_any is valid, and (2) cq_notify is valid, and (3) cq_notify type is "any", and (4) cq_last any index is at or past the cq_notify index.

The post event state is the state in which the I/O device driver 140 posts completion notification events. The I/O device driver 140 continues to post completions while in the post event state. Once the "completion notification event" is posted to the event structure 260, the completion structure 240 transitions to the "event disabled" state.

During normal operations, the completion structure 240 continuously loops between "event enabled", "armed for solicited/any event", "post event" and "event disabled" states. When the I/O device driver 120 is ready to receive a completion notification event for a completion structure 240, the I/O device driver 120 "enables events" from that completion structure 240. When the I/O device driver 140 posts a completion notification event, the I/O device driver 120 "disables further events" from that completion structure 240 automatically. This mechanism, along with proper advancement of the completion structure read indicator and completion structure notify index locations, throttles the completion notification event rate for completion structures 240.

The "solicited completion notification" is defined as either, (1) successful reception of a send message type with the "solicited event" (SE) field set, or (2) unsuccessful completion of a send or receive work request.

Figure 17:
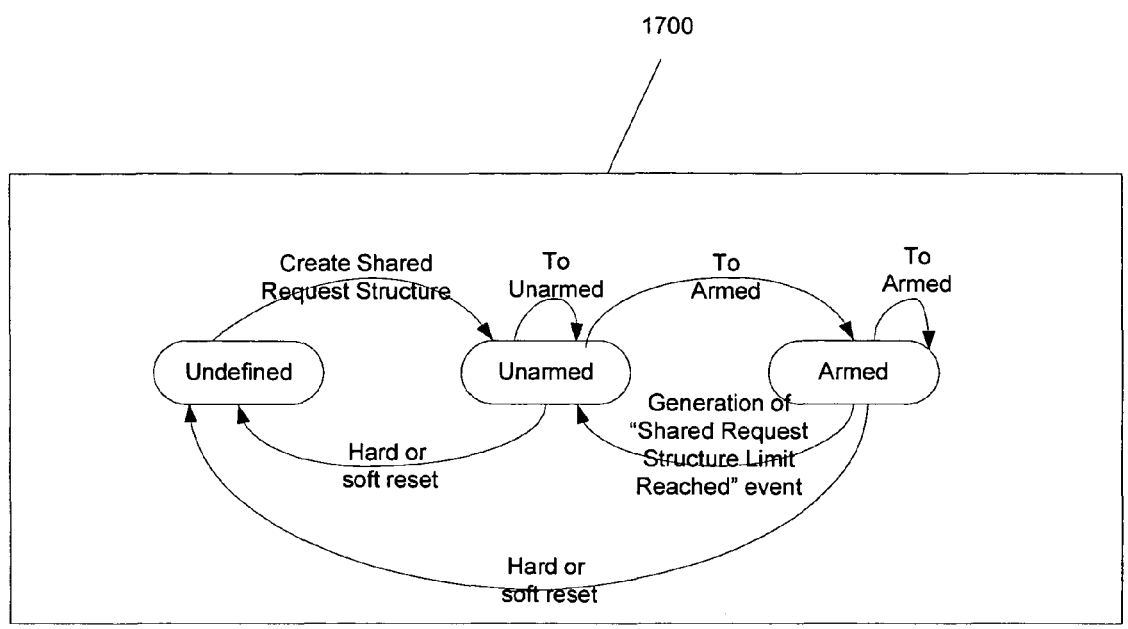
FIG. 17 illustrates a state transition diagram for a shared receive structure in accordance with certain embodiments.

FIG. 17 illustrates a state transition diagram 1700 for a shared receive structure 250 in accordance with certain embodiments. The I/O device driver 140 driver controls the "to state" state transitions. The state transition from "armed" to "unarmed" (shown as generation of shared receive structure limit event) is taken simultaneously with writing of an event entry.

The power-on default is the undefined state. The undefined state reflects the undefined status of the shared receive structure 250. If a write to a shared receive structure doorbell structure is received for a shared receive structure 250 in an undefined state, the write is ignored.

In the unarmed state, the I/O device driver 140 does not signal "shared receive structure limit reached". The shared receive structure overflow may be detected in the unarmed state.

In the armed state, the I/O device driver 140 generates a "shared receive structure limit reached" whenever needed. The I/O device driver 140 generates a "shared receive structure limit reached" event and transitions the shared receive structure 250 to the unarmed state. The shared receive structure 250 overflows are also detected while in the armed state.

During normal operation, the shared receive structure 250 may loop between unarmed and armed states based on the arming by a program 108 and/or I/O device driver 120. When the program 108 and/or I/O device driver 120 is ready to receive a "shared receive structure limit reached" event, the program 108 and/or I/O device driver 120 arms the shared receive structure 250, and when the I/O device driver 140 generates a "shared receive structure limit reached" event, the program 108 and/or I/O device driver 120 unarms the shared receive structure 250. This mechanism, along with proper advancement of the shared receive structure 250 write indicator and shared receive structure 250 read indicator, throttles the "shared receive structure limit reached" event generation rate.

The host computer 102 and I/O device 140 maintain states for the structure pairs 200, completion structures 240, shared receive structures 250, and event structures 260. The I/O device driver 120 controls the "to state" state transitions. These transitions are initiated by writing the desired state transition encoding to an appropriate doorbell structure for the data structure in doorbell address space 150. The doorbell structure is used by the I/O device driver 120 to communicate data structure state values and read/write indicators values to the I/O device 140.

Thus, in certain embodiments, the doorbell mechanism enables one or more programs 108 to directly communicate with an I/O device driver 120 regarding I/O device 140 resources. The doorbell mechanism enables doorbell writes to be secure and protected at protection domain boundaries. The doorbell structures may be protected using the protection domain and/or operating system page protection. The doorbell mechanism may be used to build I/O devices, such as TOE/RDMA-enabled NICs, chipset components, or processor components.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Field Programmable Gate Array (FPGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any suitable information bearing medium.

The term logic may include, by way of example, software or hardware and/or combinations of software and hardware. Also, the I/O device driver and the I/O controller may each include, by way of example, software or hardware and/or combinations of software and hardware.

The illustrated operations of FIGS. 13 and 14 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method capable of writing doorbell information, comprising:
   creating one or more protection domain address spaces in a doorbell space of an Input/Output (I/O) device;
   storing doorbell structures in a protection domain address space, wherein the doorbell structures include a receive doorbell structure, a send doorbell structure, completion doorbell structures, a shared receive doorbell structure, and an event doorbell structure;
   associating data structures with the protection domain address space, wherein the data structures include a receive data structure, a send data structure, completion data structures, a shared receive data structure, and an event data structure;
   receiving updated content for a data structure selected from the data structures that is associated with a doorbell structure selected from the stored doorbell structures;
   computing a doorbell structure address for the doorbell structure from a doorbell base address, a protection domain identifier associated with the data structure, and a protection domain stride that indicates a size of the protection domain address space; and
   submitting doorbell information including the computed doorbell structure address and content for the doorbell structure for writing into a write structure.

2. The method of claim 1, wherein the doorbell information is transmitted to the Input/Output (I/O) device.

3. The method of claim 1, further comprising:
   forming content for the doorbell structure.

4. A method capable of writing doorbell information, comprising:
   receiving doorbell information including a doorbell structure address and content for a doorbell structure from a write structure, wherein the doorbell structure address is for the doorbell structure stored in a protection domain address space;
   decoding a doorbell structure address from the doorbell information;
   determining a first protection domain identifier from the doorbell structure address using a doorbell base address and a protection domain stride that indicates a size of the protection domain address space;

determining a resource context of a data structure from the doorbell information, wherein the resource context includes information about the data structure that identifies a read indicator, a write indicator, and a base address of the data structure;
reading the resource context to determine a second protection domain identifier stored in the resource context; and
comparing the first protection domain identifier and the second protection domain identifier to determine whether to update the resource context.

5. The method of claim 4, further comprising:
updating the resource context of the data structure with content provided in the doorbell information in response to determining that the first protection domain identifier and the second protection domain identifier match.

6. The method of claim 4, further comprising:
ignoring the doorbell information in response to determining that the first protection domain identifier and the second protection domain identifier do not match.

7. A system for writing doorbell information, comprising:
a motherboard;
an Input/Output device including a doorbell space and coupled to a bus; and
an Input/Output device driver coupled to the bus and coupled to the motherboard;
wherein the Input/Output device driver is operable to:
create one or more protection domains domain address spaces in the doorbell space;
store doorbell structures in a protection domain address space, wherein the doorbell structures include a receive doorbell structure, a send doorbell structure, completion doorbell structures, a shared receive doorbell structure, and an event doorbell structure;
associate data structures with the protection domain address space, wherein the data structures include a receive data structure, a send data structure, completion data structures, a shared receive data structure, and an event data structure;
receive updated content for a data structure selected from the data structures that is associated with a doorbell structure selected from the stored doorbell structures;
compute a doorbell structure address for the doorbell structure from a doorbell base address, a protection domain identifier associated with the data structure, and a protection domain stride that indicates a size of the protection domain address space; and
submit doorbell information including the computed doorbell structure address and content for the doorbell structure for writing into a write structure.

8. The system of claim 7, wherein the doorbell information is transmitted to the Input/Output (I/O) device.

9. The system of claim 7, wherein the Input/Output device driver is further operable to:
form content for the doorbell structure.

10. A system for writing doorbell information, comprising:
a motherboard;
a doorbell space partitioned into one or more protection domains; and
an Input/Output controller coupled to the doorbell space and coupled to the motherboard;
wherein the Input/Output controller is operable to:
receive doorbell information including a doorbell structure address and content for a doorbell structure from a write structure, wherein the doorbell structure address is for the doorbell structure stored in a protection domain address space;
decode a doorbell address from the doorbell information;
determine a first protection domain identifier from the doorbell structure address using a doorbell base address and a protection domain stride that indicates a size of the protection domain address space;
determine a resource context of a data structure from the doorbell information, wherein the resource context includes information about the data structure that identifies a read indicator, a write indicator, and a base address of the data structure;
read the resource context to determine a second protection domain identifier stored in the resource context; and
compare the first protection domain identifier and the second protection domain identifier to determine whether to update the resource context.

11. The system of claim 10, wherein the Input/Output controller is further operable to:
update the resource context of the data structure with content provided in the doorbell information in response to determining that the first protection domain identifier and the second protection domain identifier match.

12. The system of claim 10, wherein the Input/Output controller is further operable to:
ignore the doorbell information in response to determining that the first protection domain identifier and the second protection domain identifier do not match.

13. An article of manufacture for writing doorbell information, wherein the article of manufacture comprises a computer readable storage medium storing instructions, wherein the computer readable storage medium is a member of a set of computer readable storage media consisting of a magnetic storage medium, optical storage, volatile memory devices, and non-volatile memory devices, and wherein the instructions are executed by a processor of a computer to:
create one or more protection domain address spaces in a doorbell space of an Input/Output (I/O) device;
store doorbell structures in a protection domain address space, wherein the doorbell structures include a receive doorbell structure, a send doorbell structure, completion doorbell structures, a shared receive doorbell structure, and an event doorbell structure;
associate data structures with the protection domain address space, wherein the data structures include a receive data structure, a send data structure, completion data structures, a shared receive data structure, and an event data structure;
receive updated content for a data structure selected from the data structures that is associated with a doorbell structure selected from the stored doorbell structures;
compute a doorbell structure address for the doorbell structure from a doorbell base address, a protection domain identifier associated with the data structure, and a protection domain stride that indicates a size of the protection domain address space; and
submit doorbell information including the computed doorbell structure address and content for the doorbell structure for writing into a write structure.

14. The article of manufacture of claim 13, wherein the doorbell information is transmitted to the Input/Output (I/O) device.

15. The article of manufacture of claim 13, wherein the article of manufacture is further operable to:
form content for the doorbell structure.

16. An article of manufacture for transmitting data, wherein the article of manufacture comprises a computer readable medium storing instructions, wherein the computer readable medium is a member of a set of computer readable storage media consisting of a magnetic storage medium, optical storage, volatile memory devices, and non-volatile memory devices, and wherein the article of manufacture is operable to:

receive doorbell information including a doorbell structure address and content for a doorbell structure from a write structure, wherein the doorbell structure address is for the doorbell structure stored in a protection domain address space;

decode a doorbell address from the doorbell information;

determine a first protection domain identifier from the doorbell structure address using a doorbell base address and a protection domain stride that indicates a size of the protection domain address space;

determine a resource context of a data structure from the doorbell information, wherein the resource context includes information about the data structure that identifies a read indicator, a write indicator, and a base address of the data structure;

read the resource context to determine a second protection domain identifier stored in the resource context; and compare the first protection domain identifier and the second protection domain identifier to determine whether to update the resource context.

17. The article of manufacture of claim 16, wherein the article of manufacture is further operable to:

update the resource context of the data structure with content provided in the doorbell information in response to determining that the first protection domain identifier and the second protection domain identifier match.

18. The article of manufacture of claim 16, wherein the article of manufacture is further operable to:

ignore the doorbell information in response to determining that the first protection domain identifier and the second protection domain identifier do not match.

* * * * *

UNITED STATES PATENT AND TRADEMARK OFFICE
CERTIFICATE OF CORRECTION

PATENT NO. : 7,853,957 B2  
APPLICATION NO. : 11/106824  
DATED : December 14, 2010  
INVENTOR(S) : Hemal V. Shah et al.

Page 1 of 1

It is certified that error appears in the above-identified patent and that said Letters Patent is hereby corrected as shown below:

Col. 23, Line 1, delete "readable medium" and replace with --readable storage medium--.

Col. 23, Line 2, delete "readable medium" and replace with --readable storage medium--.

Signed and Sealed this
Fifteenth Day of March, 2011

David J. Kappos
*Director of the United States Patent and Trademark Office*